(12) United States Patent
Toyooka et al.

(10) Patent No.: US 11,447,096 B2
(45) Date of Patent: Sep. 20, 2022

(54) VEHICLE DOOR LOCKING AND UNLOCKING VEHICLE-MOUNTED DEVICE, VEHICLE INCLUDING VEHICLE-MOUNTED DEVICE, AND VEHICLE DOOR LOCKING AND UNLOCKING SYSTEM INCLUDING VEHICLE-MOUNTED DEVICE

(71) Applicant: GLOBAL MOBILITY SERVICE INC., Tokyo (JP)

(72) Inventors: Hiraku Toyooka, Tokyo (JP); Keita Danjyo, Tokyo (JP); Katsuyoshi Kurahashi, Tokyo (JP)

(73) Assignee: GLOBAL MOBILITY SERVICE INC., Tokyo (JP)

( * ) Notice: Subject to any disclaimer, the term of this patent is extended or adjusted under 35 U.S.C. 154(b) by 0 days.

(21) Appl. No.: 16/625,633

(22) PCT Filed: Jun. 23, 2017

(86) PCT No.: PCT/JP2017/023245
§ 371 (c)(1),
(2) Date: Dec. 20, 2019

(87) PCT Pub. No.: WO2018/235275
PCT Pub. Date: Dec. 27, 2018

(65) Prior Publication Data
US 2020/0384948 A1    Dec. 10, 2020

(51) Int. Cl.
B60R 25/01      (2013.01)
B60R 25/24      (2013.01)
(Continued)

(52) U.S. Cl.
CPC .............. B60R 25/01 (2013.01); B60R 25/24 (2013.01); E05B 49/00 (2013.01); E05B 81/64 (2013.01); G07C 2009/00293 (2013.01)

(58) Field of Classification Search
CPC ......... B60R 25/01; B60R 25/24; E05B 49/00; E05B 81/64; G07C 2009/00293
See application file for complete search history.

(56) References Cited

U.S. PATENT DOCUMENTS 3,662,112 A  *  5/1972  Martin ................ H04M 11/045
                                                            379/40
5,835,022 A    11/1998  Amano
(Continued)

FOREIGN PATENT DOCUMENTS

DE         4032613 C1  *  5/1991
JP        S62-253884 A    11/1987
(Continued)

OTHER PUBLICATIONS

International Search Report in PCT/JP2017/023245, dated Sep. 19, 2017, 4pp.
(Continued)

Primary Examiner — Yong Hang Jiang
(74) Attorney, Agent, or Firm — Hauptman Ham, LLP

(57) ABSTRACT

A vehicle door locking and unlocking vehicle-mounted device is provided to lock and unlock a vehicle door for car rental and carsharing. The vehicle-mounted device can lock and unlock a vehicle door without using an ECU on the vehicle or CAN. The vehicle door locking and unlocking vehicle-mounted device includes communication means for receiving a lock command or an unlock command from a user terminal directly or through a server and at least one internal relay connected to wiring between a door key switch and a door lock actuator of the vehicle. The internal relay controls at least one external relay to drive the door lock actuator to lock or unlock the door.

12 Claims, 12 Drawing Sheets

(51) Int. Cl.
*E05B 49/00* (2006.01)
*E05B 81/64* (2014.01)
*G07C 9/00* (2020.01)

(56) References Cited

U.S. PATENT DOCUMENTS

| | | | |
|---|---|---|---|
| 5,887,466 A | 3/1999 | Yoshizawa | |
| 6,065,316 A * | 5/2000 | Sato | E05B 81/06 |
| | | | 292/201 |
| 6,144,294 A | 11/2000 | Watanabe | |
| 6,389,337 B1 * | 5/2002 | Kolls | B60R 25/04 |
| | | | 340/439 |
| 7,301,437 B2 * | 11/2007 | Sasaki | G07C 9/00182 |
| | | | 340/12.22 |
| 7,336,001 B2 * | 2/2008 | Ozawa | B60R 25/2036 |
| | | | 307/10.2 |
| 7,711,118 B2 * | 5/2010 | Chou | G06F 21/305 |
| | | | 380/270 |
| 9,566,943 B2 * | 2/2017 | Ferrieres | B60R 25/04 |
| 2011/0191126 A1 * | 8/2011 | Hampshire | G06Q 10/02 |
| | | | 705/5 |
| 2013/0317693 A1 * | 11/2013 | Jefferies | G07B 15/00 |
| | | | 701/31.5 |
| 2014/0159480 A1 * | 6/2014 | Totani | E05C 21/00 |
| | | | 307/9.1 |
| 2015/0343993 A1 | 12/2015 | Ferrieres et al. | |
| 2015/0348179 A1 | 12/2015 | Kamisawa | |
| 2016/0107610 A1 * | 4/2016 | Lemoult | E05B 81/64 |
| | | | 340/426.11 |
| 2018/0339676 A1 * | 11/2018 | Lazarini | G07C 9/00309 |

FOREIGN PATENT DOCUMENTS

| | | | |
|---|---|---|---|
| JP | H0586762 A | * | 9/1991 |
| JP | H5-86762 A | | 4/1993 |
| JP | H9-41755 A | | 2/1997 |
| JP | 2002019548 A | * | 1/2002 |
| JP | 2002-255014 A | | 9/2002 |
| JP | 2011-44112 A | | 3/2011 |
| JP | 2014-146120 A | | 8/2014 |
| JP | 2016-511191 A | | 4/2016 |
| KR | 20140128044 A | * | 11/2014 |
| RU | 2309861 C1 | * | 11/2007 |
| WO | 2010144490 A1 | | 12/2010 |
| WO | 2016/167350 A1 | | 10/2016 |

OTHER PUBLICATIONS

Extended European search report in EP Application No. 17914308.6, dated Jan. 18, 2021, 15pp.

Office Action in BR Application No. BR112019027421-9, dated Oct. 28, 2020, 12pp.

* cited by examiner

FIG. 4

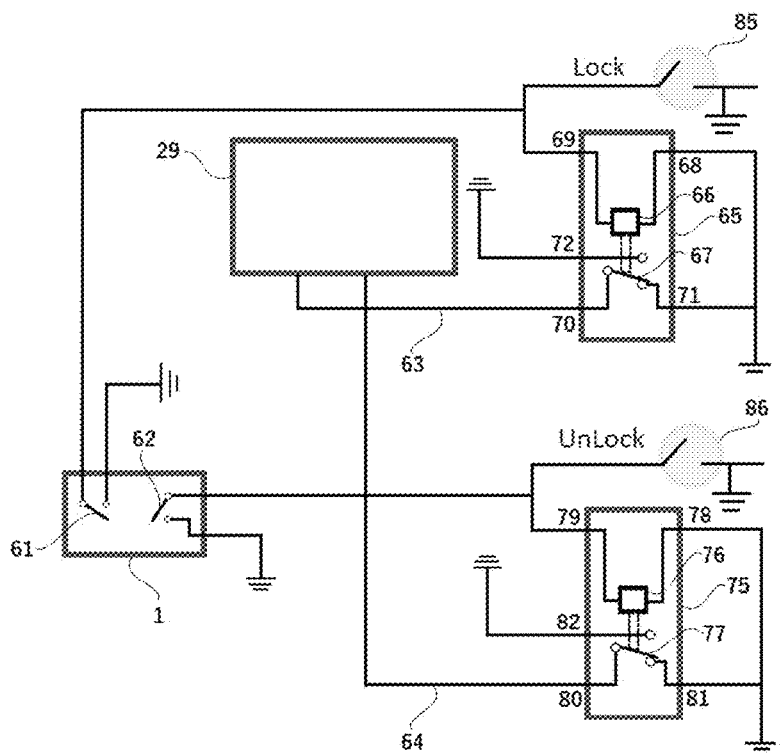

FIG. 5A                                    FIG. 5B

| RELAY A | |
|---|---|
| STATE | RELAY VALUE |
| Open | 0 |
| Close | 1 |

| COMBINATION | STATUS | VEHICLE STATE |
|---|---|---|
| 0 0 | STARTING-ENABLED STATE | STARTING POSSIBLE |
| 0 1 | STARTING-DISABLED STATE | STARTING IMPOSSIBLE |

| RELAY A | | RELAY B | |
|---|---|---|---|
| STATE | RELAY VALUE | STATE | RELAY VALUE |
| Open | 0 | Open | 0 |
| Close | 1 | Close | 1 |

| COMBINATION | STATUS | VEHICLE STATE |
|---|---|---|
| 0 0 | STARTING-ENABLED STATE | STARTING POSSIBLE |
| 0 1 | UNINTENDED VALUE | STARTING POSSIBLE |
| 1 0 | UNINTENDED VALUE | STARTING POSSIBLE |
| 1 1 | STARTING-DISABLED STATE | STARTING IMPOSSIBLE |

FIG. 16

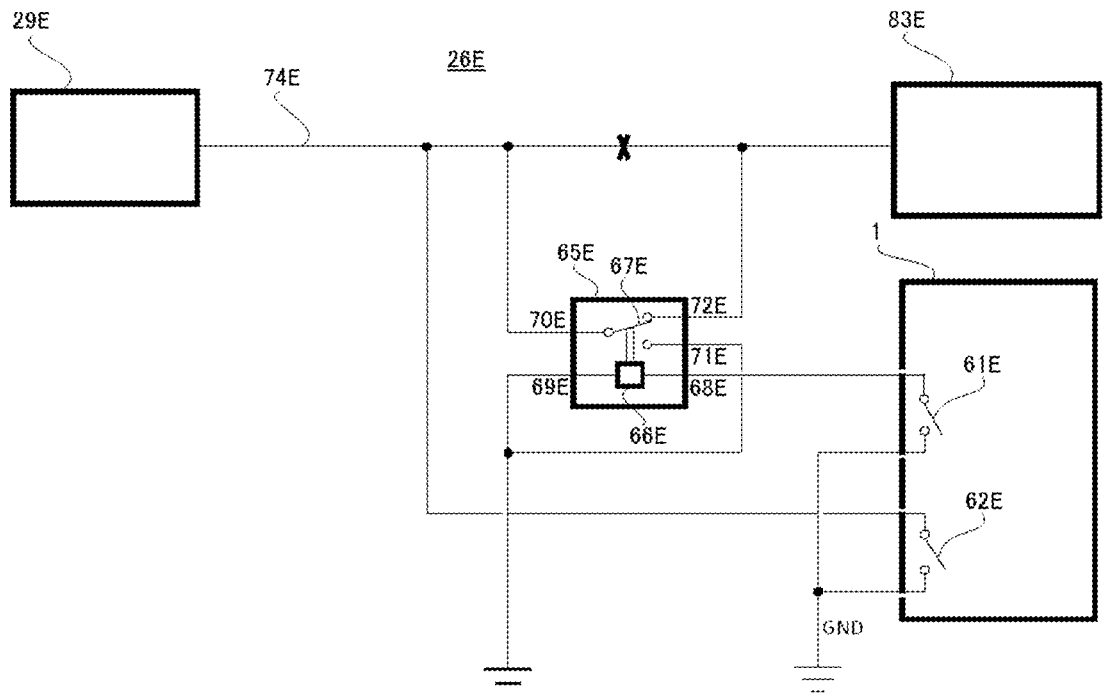

FIG. 17

| KIND OF VEHICLE | EQUIPPED WITH IMMOBILIZER | | NOT EQUIPPED WITH IMMOBILIZER | |
|---|---|---|---|---|
| | KEY TYPE | PUSH TYPE | KEY TYPE | PUSH TYPE |
| INTERNAL COMBUSTION ENGINE VEHICLE | A／B | A／B／C | A | A／C |
| EV | NOT EXIST | B／C | NOT EXIST | C |
| PARALLEL HEV | B | B／C | NOT SUPPORTED | C |
| SERIES HEV | B | B／C | NOT SUPPORTED | C |
| SERIES-PARALLEL HEV | B | B／C | NOT SUPPORTED | C |

A : CUT ST LINE
B : DISABLE KEY AUTHENTICATION
C : INVALIDATE PUSH BUTTON

VEHICLE DOOR LOCKING AND UNLOCKING VEHICLE-MOUNTED DEVICE, VEHICLE INCLUDING VEHICLE-MOUNTED DEVICE, AND VEHICLE DOOR LOCKING AND UNLOCKING SYSTEM INCLUDING VEHICLE-MOUNTED DEVICE

RELATED APPLICATIONS

The present application is a National Phase of International Application Number PCT/JP2017/023245, filed Jun. 23, 2017.

FIELD

The present invention relates to a vehicle door locking and unlocking vehicle-mounted device for car rental and/or carsharing, a vehicle including the vehicle-mounted device, and a vehicle door locking and unlocking system including the vehicle-mounted device. More specifically, the present invention relates to a vehicle door locking and unlocking system for locking and unlocking a vehicle door using a vehicle-mounted device including communication means for receiving a lock command or an unlock command from a user terminal directly or through a server.

BACKGROUND

Car rental and carsharing are alternative types of vehicle usage to car ownership and car lease. Carsharing has been popular in cases where a plurality of users share vehicles. In particular, carsharing benefits users who want to use a vehicle only for a short time or users who want to use a vehicle at a specific date and time. Carsharing also offers cost benefits since sharing vehicles among a plurality of users promotes effective use of vehicles and increases usage efficiency.

In conventional carsharing systems, for example, an IC card with a FeliCa® chip is used as a key for locking the vehicle door. This requires a terminal device for FeliCa® on the vehicle. Moreover, the system requires cumbersome processing for associating the FeliCa® chip with the terminal device for FeliCa® on the vehicle. Another approach is to use a smartphone as a key for locking the vehicle door. In order to use a smartphone as a key, it is necessary to provide a terminal device capable of communicating with the smartphone on the vehicle and then download in advance key information corresponding to the target vehicle to the smartphone. Downloading key information to the smartphone in advance is cumbersome. Both in the case of using an IC card with a FeliCa® chip and in the case of using a smartphone, if the IC card with a FeliCa® (registered trademark) chip or the smartphone is stolen or lost, the key to the vehicle may be used maliciously, or the user becomes unable to unlock or lock the doors of the target vehicle.

In order to solve such inconvenience, a system has been proposed which locks and unlocks a vehicle door with a signal from a base station, rather than direct communication between the user terminal and the vehicle. In Patent Literature 1 below, when using a vehicle, a user transmits a user request from a user terminal such as a mobile phone to a remote user server. The remote user server then authenticates the user and transmits an unlock request to a remote vehicle server. The remote vehicle server, receiving the unlock request, transmits a request for unlocking the door to a communication device on the vehicle. A request for unlocking the door is then transmitted from the communication device on the vehicle to a control system on the vehicle. The control system on the vehicle then unlocks the vehicle door.

CITATION LIST

Patent Literature

Patent Literature 1: Japanese Translation of PCT Application No. 2016-511191

SUMMARY

Technical Problem

In Patent Literature 1 above, when the communication device on the vehicle receives a request for locking or unlocking the door from the remote vehicle server, a request for locking or unlocking the door is transmitted from the communication device on the vehicle to the control system such as an ECU on the vehicle, whereby the door is locked or unlocked. In both conventional cases of using an IC card with a FeliCa® chip and of using a smartphone, the request for locking or unlocking is processed by the control system on the vehicle, such as an ECU. Communication standards such as CAN (Controller Area Network) are generally used for communication between the ECU and the communication device or the door lock system in the vehicle. CAN is one of the protocols widely used in on-vehicle control networks, including Local Interconnect Network (LIN) and FlexRay, and is used in many commercially available vehicles. However, it has been pointed out that CAN is vulnerable to security risks. An example of a CAN attack is message spoofing, which has been proven to allow unauthorized control such as manipulation of indicator display and disabling of the brake.

Vehicles are accompanied with a vehicular self-diagnosis function called OBD2 (On-Board Diagnostics Second Generation). In a case of vehicle trouble, one can connect to OBD2 using a special device to determine which part of the vehicle has a malfunction (for example, a failure in the injection circuit). In recent years, many of telematics terminals connect to OBD2 described above to sense CAN information on OBD2 (for example, fuel information, speed information, etc.) for servers. A case was discovered in which the vulnerability of telematics terminals allowed an attacker to intrude into an in-vehicle network through wireless communication and remotely control the vehicle. This leads us to recognize the risk of the telematics terminals using OBD2. The telematics terminals therefore have been required to perform information sensing without using OBD2 ports.

In view of the issues of the conventional techniques and Patent Literature 1, one problem to be solved by the subject application is to provide a vehicle door locking and unlocking vehicle-mounted device for locking and unlocking a vehicle door for car rental and carsharing, in which the vehicle-mounted device can lock and unlock a door of a vehicle without using the ECU on the vehicle or CAN.

Another problem to be solved by the subject application is to provide a vehicle door locking and unlocking vehicle-mounted device for locking and unlocking a vehicle door for car rental and carsharing, in which the vehicle-mounted device can lock and unlock a door of a vehicle without using the ECU on the vehicle or CAN, and the vehicle-mounted device is adapted to wiring of a door lock actuator control circuit.

Another problem to be solved by the subject application is to provide a vehicle door locking and unlocking vehicle-mounted device for locking and unlocking a vehicle door for car rental and carsharing, in which a door of a vehicle can be locked and unlocked from a user terminal through a server, and the vehicle-mounted device can lock and unlock a door of a vehicle without using the ECU on the vehicle or CAN.

Another problem to be solved by the subject application is to provide a vehicle door locking and unlocking vehicle-mounted device for locking and unlocking a vehicle door for car rental and carsharing, in which door lock and unlock commands can be transmitted from a user terminal directly to the vehicle-mounted device, and the vehicle-mounted device can lock and unlock a door of a vehicle without using the ECU on the vehicle or CAN.

Another problem to be solved by the subject application is to provide a vehicle door locking and unlocking system, in which when a vehicle is used without an advance reservation or when a manner of usage of a certain vehicle violates a condition set at the time of reservation, an engine starting relay control command from a server can switch the vehicle from a starting-enabled state to a starting-disabled state.

Another problem to be solved by the subject application is to provide a vehicle door locking and unlocking system, in which the safety of a vehicle is considered when the vehicle is switched from the starting-enabled state to the starting-disabled state, and the starting-disabled state is prevented from being entered in a state in which the vehicle is in a dangerous place or in a place where the vehicle obstructs people.

Another problem to be solved by the subject application is to provide a vehicle including the vehicle door locking and unlocking vehicle-mounted device.

Another problem to be solved by the subject application is to provide a vehicle door locking and unlocking system including the vehicle door locking and unlocking vehicle-mounted device.

Another problem to be solved by the subject application is to provide a vehicle door locking and unlocking system capable of making a reservation for a vehicle and managing door lock key information.

Yet another problem to be solved by the subject application is to provide a vehicle door locking and unlocking system capable of transmitting a lock command or an unlock command from a server to the vehicle-mounted device on the vehicle, without a user terminal.

Solution to Problem

The object of the present invention can be achieved by the following configuration. That is, a first aspect of the present invention provides a vehicle door locking and unlocking vehicle-mounted device. The vehicle-mounted device includes communication means for receiving a lock command or an unlock command from a user terminal directly or through a server and at least two internal relay connected to wiring installed in a vehicle between a door key switch installed in the vehicle and a door lock actuator installed in the vehicle. The internal relay includes a first internal relay and a second internal relay independently connected to ground or a power supply, the first internal relay and the second internal relay controlling at least one external relay to respectively control locking and unlocking of a door installed in the vehicle. When the lock command is received, a state of the internal relay changes for a certain time to drive the door lock actuator in a first direction to lock the door. When the unlock command is received, a state of the internal relay changes for a certain time to drive the door lock actuator in a second direction to unlock the door.

According to a second aspect of the present invention, in the vehicle-mounted device of the first aspect, the door lock actuator is any one of a door lock motor unit, a vacuum pump unit, and a central door lock module.

According to a third aspect of the present invention, in the vehicle-mounted device of the first or second aspect, the internal relay includes a first internal relay and a second internal relay. The first internal relay and/or the second internal relay controls at least one external relay to control locking or unlocking of the door of the vehicle. When the lock command is received, a state of the first internal relay changes for a certain time to drive the door lock actuator in a first direction to lock the door. When the unlock command is received, a state of the second internal relay changes for a certain time to drive the door lock actuator in a second direction to unlock the door.

According to a fourth aspect of the present invention, in the vehicle-mounted device of any one of the first to third aspects, the external relay includes a first external relay and a second external relay.

According to a fifth aspect of the present invention, in the vehicle-mounted device of the fourth aspect, the door lock actuator is powered through two power feed lines. When the lock command is received, a state of the first internal relay changes for a certain time, so that one of the power feed lines is grounded by the first external relay to drive the door lock actuator in a first direction to lock the door. When the unlock command is received, a state of the second internal relay changes for a certain time, so that the other of the power feed lines is grounded by the second external relay to drive the door lock actuator in a second direction to unlock the door.

According to a sixth aspect of the present invention, in the vehicle-mounted device of the fourth aspect, the door lock actuator is powered through two power feed lines. When the lock command is received, a state of the first internal relay changes for a certain time, so that power supply voltage is applied from the first external relay to one of the power feed lines to drive the door lock actuator in a first direction to lock the door. When the unlock command is received, a state of the second internal relay changes for a certain time, so that power supply voltage is applied from the second external relay to the other of the power feed lines to drive the door lock actuator in a second direction to unlock the door.

According to a seventh aspect of the present invention, in the vehicle-mounted device of the fourth aspect, the door lock actuator is powered through two power feed lines. The two power feed lines are respectively connected with a first external relay and a second external relay and are connected to a door lock relay unit. When the lock command is received, a state of the first internal relay changes for a certain time, so that power supply voltage is applied from the first external relay to one of the power feed lines to drive the door lock actuator in a first direction to lock the door. When the unlock command is received, a state of the second internal relay changes for a certain time, so that power supply voltage is applied from the second external relay to the other of the power feed lines to drive the door lock actuator in a second direction to unlock the door.

According to an eighth aspect of the present invention, in the vehicle-mounted device of the fourth aspect, the door lock actuator is powered through two power feed lines. The two power feed lines are connected with a door lock relay unit respectively through a first external relay and a second external relay, and at least part of wiring at a portion bypassed by the first external relay and the second external relay is cut off. When the lock command is received, a state of the first internal relay changes for a certain time, so that power supply voltage is applied from the first external relay to one of the power feed lines to drive the door lock actuator in a first direction to lock the door. When the unlock command is received, a state of the second internal relay changes for a certain time, so that power supply voltage is applied from the second external relay to the other of the power feed lines to drive the door lock actuator in a second direction to unlock the door.

According to a ninth aspect of the present invention, in the vehicle-mounted device of the fourth aspect, the door lock actuator is powered through one power feed line. The one power feed line is connected through a first external relay and a second external relay, and at least part of wiring at a portion bypassed by the first external relay and the second external relay is cut off. When the lock command is received, a state of the first internal relay changes for a certain time, so that the one power feed line is grounded to drive the door lock actuator in a first direction to lock the door. When the unlock command is received, a state of the second internal relay changes for a certain time, so that power supply voltage is applied to the one power feed line to drive the door lock actuator in a second direction to unlock the door.

According to a tenth aspect of the present invention, in the vehicle-mounted device of the third aspect, the door lock actuator is powered through one power feed line. The one power feed line is connected through a first external relay, and at least part of wiring at a portion bypassed by the first external relay is cut off. When the lock command is received, a state of the first internal relay changes for a certain time, so that power supply voltage is applied to the one power feed line to drive the door lock actuator in a first direction to lock the door. When the unlock command is received, a state of the second internal relay changes for a certain time, so that the one power feed line is grounded to drive the door lock actuator in a second direction to unlock the door.

According to an eleventh aspect of the present invention, in the vehicle-mounted device of any one of the first to tenth aspects, the communication means receives an unlock command or a lock command from a user terminal through a server.

According to a twelfth aspect of the present invention, in the vehicle-mounted device of any one of the first to tenth aspects, the communication means receives an unlock command or a lock command directly from a user terminal.

According to a thirteenth aspect of the present invention, in the vehicle-mounted device of any one of the first to twelfth aspects, the communication means receives an engine starting relay control command to switch between a starting-disabled state and a starting-enabled state of the vehicle from the server. The vehicle-mounted device further includes engine starting relay input/output means for controlling an engine starting external relay configured to switch between the starting-disabled state and the starting-enabled state of the vehicle and vehicle information-associated control means for controlling the engine starting external relay based on the engine starting relay control command.

According to a fourteenth aspect of the present invention, in the vehicle-mounted device of the thirteenth aspect, the vehicle-mounted device further includes vehicle information detecting means for detecting at least an on/off state of vehicle power. The vehicle information-associated control means controls the external relay based on an elapsed time since a change in the on/off state of vehicle power detected by the vehicle information detecting means.

A fifteenth aspect of the present invention provides a vehicle including the vehicle-mounted device of any one of the first to fourteenth aspects.

A sixteenth aspect of the present invention provides a system including the vehicle-mounted device of any one of the first to fourteenth aspects.

According to a seventeenth aspect of the present invention, in the system of the sixteenth aspect, the server makes a reservation for a certain vehicle based on operation from a user terminal.

According to an eighteenth aspect of the present invention, in the system of the seventeenth aspect, the server transmits door lock key information corresponding to the vehicle-mounted device of the certain vehicle to the user terminal in advance based on information on the reservation. The user terminal transmits a lock command or an unlock command directly to the vehicle-mounted device or to the vehicle-mounted device through the server, based on the door lock key information.

According to a nineteenth aspect of the present invention, in the system of any one of the sixteenth to eighteenth aspects, the server transmits, to the vehicle-mounted device of the certain vehicle, an engine starting relay control command to switch the vehicle to a starting-disabled state in a case: where the certain vehicle is used without an advance reservation; where there is a problem in making payment for the reservation; where the certain vehicle is used for a predetermined period or longer beyond a period of the reservation without advance procedure for extension; where the certain vehicle is used in a geographical range beyond a range set at the time of reservation; or where a manner of usage of the certain vehicle violates a condition set at the time of reservation.

According to a twentieth aspect of the present invention, in the system of any one of the seventeenth to nineteenth aspects, when the door lock key information is not sent from the user terminal, the server also transmits a lock command or an unlock command to the vehicle-mounted device of the certain vehicle upon confirmation of the reservation and user authentication by the server.

Advantageous Effects of Invention

According to the first aspect, in the vehicle door locking and unlocking vehicle-mounted device for locking and unlocking the vehicle door for car rental and carsharing, the vehicle-mounted device can lock and unlock the door of the vehicle without using an ECU on the vehicle.

According to the second aspect, the vehicle-mounted device can be adapted to a variety of door lock actuators.

According to the third aspect, in the vehicle door locking and unlocking vehicle-mounted device, the two internal relays are provided to drive the door lock actuator in the locking direction or the unlocking direction.

According to the fourth aspect, the two external relays can be controlled appropriately.

According to the fifth to tenth aspects, the vehicle door locking and unlocking vehicle-mounted device is adapted to wiring of the lock actuator control circuit.

According to the eleventh aspect, in the vehicle door locking and unlocking vehicle-mounted device for locking and unlocking the vehicle door for car rental and carsharing, the door of the vehicle can be locked and unlocked from the user terminal through the server, and the vehicle-mounted device can lock and unlock the door of the vehicle without using an ECU on the vehicle.

According to the twelfth aspect, in the vehicle door locking and unlocking vehicle-mounted device for locking and unlocking the vehicle door for car rental and carsharing, door lock and unlock commands can be transmitted from the user terminal directly to the vehicle-mounted device, and the vehicle-mounted device can lock and unlock the door of the vehicle without using an ECU on the vehicle.

According to the thirteenth aspect, in the vehicle door locking and unlocking system, when the vehicle is used without an advance reservation or when the manner of usage of the certain vehicle violates the condition set at the time of reservation, the engine starting relay control command from the server can switch the vehicle from the starting-enabled state to the starting-disabled state.

According to the fourteenth aspect, in the vehicle-mounted device, in another problem to be solved by the subject application, the safety of the vehicle is considered when the vehicle is switched from the starting-enabled state to the starting-disabled state, and the starting-disabled state is prevented from being entered in a state in which the vehicle is in a dangerous place or in a place where the vehicle obstructs people.

According to the fifteenth aspect, the vehicle achieves the effects brought by the vehicle door locking and unlocking vehicle-mounted device.

According to the sixteenth aspect, the vehicle door locking and unlocking system achieves the effects brought by the vehicle door locking and unlocking vehicle-mounted device.

According to the seventeenth and eighteenth aspects, the system can make a reservation for a vehicle and manage door lock key information.

According to the nineteenth aspect, the system can switch the vehicle to the starting-disabled state if necessary.

According to the twentieth aspect, in the system, the server can transmit the lock command or the unlock command to the vehicle-mounted device on the vehicle to control locking and unlocking of the door of the vehicle without the user terminal.

BRIEF DESCRIPTION OF DRAWINGS

FIG. 4 is a wiring diagram of a door lock actuator control circuit according to the first embodiment.

FIG. 5A illustrates relay values in a case of a vehicle type having one starting control line and FIG. 5B illustrates relay values in a case of a vehicle type having two starting control lines.

FIG. 16 is a wiring diagram of a door lock actuator control circuit according to a seventh embodiment.

FIG. 17 is an illustration of a starting-disabled state for each vehicle type.

DESCRIPTION OF EMBODIMENTS

Figure 1:
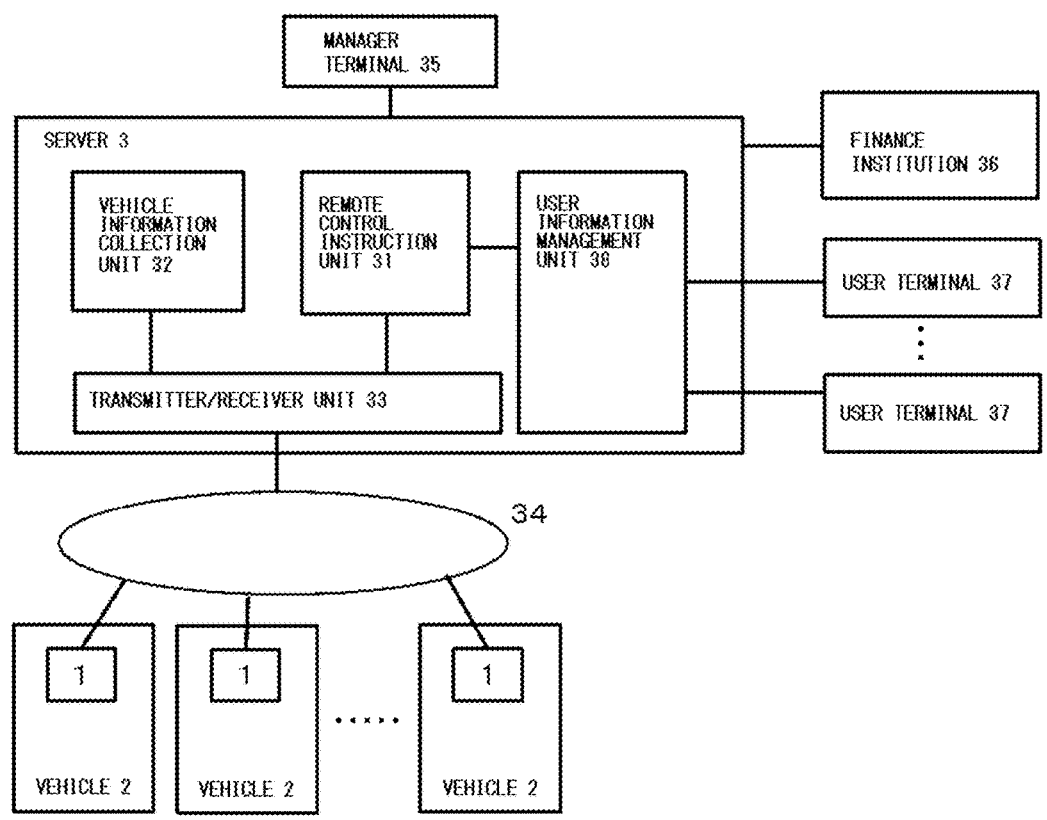
FIG. 1 is an overview of a vehicle door locking and unlocking system according to a first embodiment.

A vehicle-mounted device, a vehicle including the vehicle-mounted device, and a vehicle door locking and unlocking system including the vehicle-mounted device according to embodiments of the present invention will be described below with reference to the drawings. It should be noted that the embodiments below show the vehicle door locking and unlocking system for embodying the technical concepts of the present invention only by way of illustration. The present invention is not limited to these embodiments and equally encompasses other embodiments that fall within the scope of the claims.

First Embodiment

Referring to FIG. 1 to FIG. 10, a vehicle door locking and unlocking system according to a first embodiment of the present invention will be described. In the first embodiment, a description will be given of a system in which a lock command or an unlock command is transmitted from a user terminal 37 to a vehicle-mounted device 1 on a vehicle 2 through a server 3, and the vehicle-mounted device 1 enables locking or unlocking of the vehicle door. In connection with locking and unlocking a door, the terms "internal relay" and "external relay" are used. In the present embodiment, for the operation of switching a vehicle to a starting-disabled state, an internal combustion engine vehicle that runs on an internal combustion engine, such as a gasoline engine is described by way of example. In an embodiment of the system, an engine starting external relay 20 cuts off an engine starting control line (ST line) 23 of the internal combustion engine to switch to the starting-disabled state. The terms "engine starting relay input/output 18" and "engine starting external relay 20" are used for the operation of switching the vehicle to a starting-disabled state, as distinguished from the terms "internal relay" and "external relay" previously mentioned.

FIG. 1 is an overview of a vehicle door locking and unlocking system for use in car rental or carsharing. In car rental or carsharing, the system provides services of remotely stopping a certain vehicle (starting-disabled state), and identifying the position of the vehicle and retrieving the vehicle in the following case: where the certain vehicle is used without an advance reservation; where there is a problem in making payment for the reservation; where the certain vehicle is used for a predetermined period or longer beyond a period of the reservation without advance procedure of extension; where the certain vehicle is used in a geographical range beyond a range set at the time of reservation; or where a manner of usage of the certain vehicle violates a condition set at the time of reservation. In the embodiments, car rental or carsharing will be described. However, the present invention is not limited thereto and is applicable to those requiring that vehicles should be remotely stopped (starting-disabled state), for example, applicable to car lease. When applied to car lease, this system provides services of remotely stopping the vehicle (starting-disabled state) and identifying the position of the vehicle to retrieve the vehicle if the user provided with the vehicle has not paid a charge (for example, monthly fee) within a predetermined time limit. The system includes vehicles 2 provided to users, vehicle-mounted devices 1 installed in the vehicles 2, and a server 3 configured to communicate with the vehicle-mounted devices 1 to manage locking and unlocking of each vehicle and communicate with the user terminal 37 to manage a reservation of a vehicle.

One vehicle-mounted device 1 is installed per vehicle. The vehicle-mounted device 1 is installed at any place in the vehicle 2 as long as the vehicle-mounted device 1 can control the vehicle 2, as will be described later. When the vehicle-mounted device 1 is an add-on, it can be installed at a place easy to access for installation, for example, under the passenger's seat. When the vehicle-mounted device 1 is installed for an antitheft purpose, it can be disposed at a place difficult to access and remove from the vehicle-mounted device 1, for example, in the lower portion of the engine compartment or the inside of the instrument panel. Alternatively, the vehicle-mounted device 1 may be built in beforehand during manufacturing of the vehicle 2. The vehicle-mounted device 1 transmits vehicle information on the vehicle 2 acquired by vehicle information detecting means to the server through a wireless communication network 34 and receives a lock command, an unlock command, and an engine starting relay control signal from the server 3 through the wireless communication network 34 to control a door lock actuator 29 and the engine starting external relay 20 (see FIG. 2) of the vehicle 2 described later. Locking and unlocking of a vehicle door can be remotely controlled through the server 3, based on a lock command and an unlock command from the user terminal, by controlling the door lock actuator 29.

The starting-disabled state and the starting-enabled state of the vehicle can be switched by controlling the engine starting external relay 20. In the case of an internal combustion engine car, in the starting-disabled state, the engine is unable to be started (this does not mean that the started engine is turned off but means that restarting of the engine is prohibited), whereas in the starting-enabled state, the engine is able to be started. Here, the wireless communication network 34 is any network that enables communication between the vehicle-mounted device 1 and the server 3, and examples include 2G, 3G, 4G, 5G, Wi-Fi®, WiMAX®, wireless LANs, beacons, Bluetooth®), and ZigBee®.

The server 3 includes a user information management unit 38, a remote control instruction unit 31, a vehicle information acquisition unit 32, and a transmission/reception unit 33. The user information management unit 38 communicates with the user terminal 37 to manage the reservation of a vehicle, transmits door lock key information to the user terminal 37 in accordance with a reservation status, and accepts a lock command and an unlock command from the user terminal 37. The remote control instruction unit 31 generates a lock command, an unlock command, and an engine starting relay control command to the vehicle-mounted device 1. The vehicle information acquisition unit 32 acquires vehicle information from the vehicle-mounted device 1. The transmission/reception unit 33 transmits/receives data to/from the vehicle-mounted device. The server 3 is connected to a manager terminal 35 and a finance institution 36.

The user terminal 37 is preferably a portable terminal such as a smartphone, a mobile phone, and a tablet terminal and is at least portable in order to be used as the door lock key of a vehicle. The vehicle 2 and the user terminal 37 preferably have the GPS function. With the GPS function on the vehicle 2 and the user terminal 37, the server 3 can grasp the position of the vehicle through the GPS installed on the vehicle 2 and grasp the position of the user through the GPS of the user terminal 37, and therefore can determine whether the lock command and the unlock command transmitted from the user terminal 37 are valid or invalid. More specifically, when the user terminal 37 is distant from the corresponding vehicle 2, the server 3 determines that the unlock command transmitted from the user terminal 37 is invalid and does not transmit an unlock command to the corresponding vehicle 2. On the other hand, when the user terminal 37 is located close to the corresponding vehicle 2, the server 3 determines that the unlock command transmitted from the user terminal 37 is valid and transmits an unlock command to the corresponding vehicle 2. Here, the GPS function provided on the vehicle 2 and the user terminal 37 is used to detect the distance between the vehicle 2 and the user terminal 37. However, any other configuration may be used to detect the distance between the vehicle 2 and the user terminal 37. For example, when the user terminal 37 and the vehicle-mounted device 1 each contain a transmitter/receiver for certain near field communication, the distance can be determined based on whether the distance between the user terminal 37 and the reserved vehicle 2 is within an area of near field communication from the user terminal 37 to the vehicle-mounted device 1. Examples of the near field communication include Bluetooth®, ZigBee®, infrared communication, and FRID. However, the present invention is not limited those examples, and any other type of near field communication may be employed.

The user can reserve a vehicle from a PC at home and can transmit a lock command and an unlock command to the corresponding vehicle using a smartphone as long as the smartphone has received door lock key information. In the present invention, therefore, the user terminal 37 is not limited to one portable terminal and is implemented in various manners, for example, such that all of a plurality of portable terminals such as smartphones and tablet terminals can transmit a lock command and an unlock command to one certain vehicle.

The server 3 can be connected to the external finance institution 36 to determine whether each user has paid a predetermined charge within a predetermined period. Alternatively, the server 3 may have the function as the finance institution 36.

The transmission/reception unit 33 communicates with a plurality of vehicle-mounted devices 1 by radio through the wireless communication network 34. FIG. 1 depicts the communication through the wireless communication network 34 and the communication between the user information management unit 38 and the user terminal 37, independently. However, the communication between the user information management unit 38 and the user terminal 37 may be performed through the wireless communication network 34. Examples of the communication between the user information management unit 38 and the user terminal 37 include 2G, 3G, 4G, 5G, Wi-Fi®, WiMAX®, wireless LANs, beacons, Bluetooth®, and ZigBee®.

The manager terminal 35 includes display means such as a display for displaying information for the manager and information input means for inputting information from the manager. The manager terminal 35 is, for example, a PC, a tablet terminal, or a portable terminal. A touch panel display, a keyboard, a mouse, and the like can be used as the information input means. In the case of a touch panel display, a separate keyboard or the like can be omitted.

The server 3 can grasp the vehicle operation status from the vehicle information periodically received from the vehicle-mounted device 1. Preferably, the vehicle information includes vehicle door lock status, on/off information on the power of the vehicle, power supply input detection information, the state of the engine starting external relay, and GPS position information on the vehicle. The server 3 grasps the vehicle operation status to determine, as necessary, whether the vehicle is parked at a predetermined parking area, whether the vehicle is parked at a place other than a predetermined parking area, whether the user is moving using the vehicle, or whether there is a possibility that the vehicle has been stolen.

The server 3 may automatically perform: the determination as to whether the certain vehicle is used without an advance reservation; the determination as to whether there is a problem in making payment for the reservation; the determination as to whether the certain vehicle is used for a predetermined period or longer beyond the reservation period without advance procedure for extension; the determination as to whether the vehicle is used in a geographical range beyond a range set at the time of reservation; the determination as to whether a manner of usage of the certain vehicle violates a condition set at the time of reservation; the determination as to whether the user has paid a predetermined charge within a predetermined period; the determination as to whether to change the corresponding vehicle to the starting-disabled state; the determination as to the vehicle operation state as described later; or the determination as to whether to make an inquiry to the user and call the police in the event of a theft or in the event of an abnormality as described later. Alternatively, some or all of the determinations may be performed manually by the manager, as necessary. Automation by the server 3 can alleviate the burden on the manager. On the other hand, manual operation of some or all of the determinations by the manager can eliminate the need for complicated condition determinations in the server 3 and thus simplify the configuration of the server 3.

The method of automatically determining the vehicle operation status by the server 3 will now be described in detail. In carsharing and car rental, the parking areas for users to pick up and return vehicles are registered in advance from among a plurality of offices (for example, manned or unmanned parking areas). Also in car lease, users register parking areas they mainly use, in advance. When the power of the vehicle is off for a predetermined time or longer at a place corresponding to the parking area registered in advance, it is determined that the vehicle is parked at a predetermined parking area. On the other hand, when the power of the vehicle is off for a predetermined time or longer at a place other than the parking areas registered in advance, it is determined that the vehicle is parked at a place other than the predetermined parking areas. When the vehicle is located at a place other than the parking areas registered in advance and the power of the vehicle is not off for a predetermined time or longer, it is determined that the user is moving using the vehicle.

When the vehicle is out of the range registered in advance by the user for a predetermined period or longer, it is determined that there is a possibility that the vehicle has been stolen. If it is determined that there is a possibility that the vehicle has been stolen, the contact registered in advance by the user is notified of the vehicle operation status, and an inquiry is made as to whether a theft has occurred. If there is no reply from the user within a predetermined period or if there is a reply indicating theft from the user, a notification of theft is given to the manager, and an engine starting relay control command corresponding to the starting-disabled state is transmitted to the vehicle-mounted device 1. If the manager receives a notification of theft from the server 3, the manager makes contact with the user to check on the occurrence of theft and then reports the vehicle theft to the police if necessary.

The vehicle-mounted device 1 further includes means for detecting an abnormality such as removal of the vehicle-mounted device 1 from the vehicle 2 or cutting-off or removal of wiring connected to the vehicle-mounted device 1. When such an abnormality is detected, the vehicle-mounted device 1 notifies the server 3 of the occurrence of abnormality. When given this notification, the server 3 promptly gives a notification to the manager. When receiving the notification of the abnormality from the server 3, the manager makes contact with the user to check on the occurrence of theft and then reports the vehicle theft to the police if necessary.

Examples of possible cases where the vehicle-mounted device 1 has been removed from the vehicle 2 include (1) theft by a thief, (2) misuse of the vehicle by the user, and (3) use of the vehicle in an unavoidable and urgent case by the user who has not paid. Assuming that removal of the vehicle-mounted device 1 from the vehicle 2 is always theft or misuse as in the cases (1) and (2), it is desirable to set the vehicle to the starting-disabled state. On the other hand, assuming that removal of the vehicle-mounted device 1 from the vehicle 2 is an urgent case as in the case (3), for example, when an emergency patient is to be transported, it is desirable to set the vehicle to the starting-enabled state. As will be described later, the engine starting external relay 20 can switch its connection to select a mode of setting the starting-disabled state or a mode of setting the starting-enabled state when the wiring is cut off or removed. Accordingly, the engine starting external relay 20 is preset to enter the starting-disabled state if the vehicle-mounted device 1 detects the abnormality or if the manager assumes theft or misuse as in the cases (1) and (2) when the wiring of the engine starting external relay 20 is cut off or removed, whereas the engine starting external relay 20 is preset to enter the starting-enabled state if the manager assumes an urgent case as in the case (3).

The control of the engine starting external relay 20 depending on whether the user has made payment in carsharing or car rental will now be described. In carsharing or car rental, the user makes a reservation for a certain vehicle from the user terminal 37 at the user information management unit 38 of the server 3. After payment of the charge is completed, for example, by credit card, the user information management unit 38 transmits door lock key information to the user terminal 37. This prevents unlocking of the doors of the certain vehicle without paying the charge and thus prevents use of the vehicle without paying the charge.

However, there is a possibility that the user uses the certain vehicle far beyond the reservation period. More specifically, users may often delay in returning the vehicles due to traffic conditions and other reasons. Users therefore are basically allowed to use the certain vehicle for an extended period of time by registering for an extended use period in advance at the user information management unit 38 of the server 3 using the user terminal 37 and paying the charge, for example, by credit card for the extended use. By contrast, if the user keeps using the certain vehicle far beyond the reservation period without an advance registration of an extended use period, the server 3 transmits a signal to switch the certain vehicle to the starting-disabled state to the vehicle-mounted device 1 after ensuring the safety of the vehicle. Specifically, shortly before the end of the reservation time (for example, 15 minutes before), the server 3 transmits a warning that the reservation time will be over soon, to register for an extended use period, and that the vehicle will be switched to the starting-disabled state if the vehicle is used after a predetermined period (for example, 6 hours) or longer elapses without registering for an extended period of use, simultaneously or timely to the user terminal 37. The period from the end of the reservation time is measured, and if an extended use period is not registered after a predetermined period (for example, 6 hours) or longer elapses, the server 3 checks the vehicle operation status. If the vehicle operation status satisfies a predetermined condition, the server 3 transmits an engine starting relay control command corresponding to the starting-disabled state from the remote control instruction unit 31 to the vehicle-mounted device 1 in order to set the corresponding vehicle 2 to the starting-disabled state. The vehicle-mounted device 1, receiving the engine starting relay control command corresponding to the starting-disabled state, switches the engine starting external relay 20 to the starting-disabled state. This brings the corresponding vehicle 2 into the starting-disabled state, that is, the engine is in a starting-disabled state in the case of an internal combustion engine vehicle.

On the other hand, without an engine starting relay control command corresponding to the starting-disabled state from the server 3 to the vehicle-mounted device 1, the engine starting external relay 20 is usually set to the starting-enabled state. Thus, with a predetermined reservation procedure, there is no engine starting relay control command corresponding to the starting-disabled state from the server 3 to the vehicle-mounted device 1. In this case, the engine starting external relay 20 is set to the starting-enabled state, and the corresponding vehicle 2 is in the starting-enabled state, that is, the engine is in a starting-enabled state in the case of an internal combustion engine vehicle. Even after the certain vehicle enters the starting-disabled state due to the use of the vehicle for a predetermined period (for example, 6 hours) beyond the reservation time, if the user pays the charge in accordance with the predetermined condition given by the manager, the server 3 promptly transmits an engine starting relay control command corresponding to the starting-enabled state from the remote control instruction unit 31 to the corresponding vehicle-mounted device 1 in order to set the corresponding vehicle to the starting-enabled state again. When the vehicle-mounted device 1 receives the engine starting relay control command corresponding to the starting-enabled state, the engine starting external relay 20 is switched to the starting-enabled state to bring the corresponding vehicle into the starting-enabled state again.

However, if the user does not pay the charge for another predetermined period (about 6 hours, that is, about 12 hours after the initial reservation period) after the corresponding vehicle 2 enters the starting-disabled state, the manager makes arrangement to retrieve the vehicle, using the position information on the certain vehicle acquired by the vehicle information acquisition unit 32. The manager, grasping the position of the certain vehicle, makes arrangement to send a worker carrying a portable terminal to the position of the vehicle. The position information on the corresponding vehicle 2 and door lock key information have been transmitted to the worker's portable terminal from the server 3.

The worker confirms whether the corresponding vehicle is in a safe state and, if safe, transmits an unlock command from the portable terminal 37 of the worker to the vehicle-mounted device 1 of the corresponding vehicle 2 through the server 3 to allow the vehicle-mounted device 1 to unlock the doors of the vehicle 2. Subsequently, a worker starting-enabling command for setting the corresponding vehicle 2 to the starting-enabled state is transmitted from the worker's portable terminal to the server 3. The server 3, receiving the worker starting-enabling command, transmits an engine starting relay control command corresponding to the starting-enabled state from the engine remote control instruction unit 31 to the vehicle-mounted device 1 on the corresponding vehicle 2. However, the server 3 may transmit an engine starting relay control command to the worker's portable terminal in advance, so that the worker's portable terminal transmits an engine starting relay control command corresponding to the starting-enabled state to the vehicle-mounted device 1 on the corresponding vehicle 2 even if the server 3 and the worker's portable terminal are not in a communicative state when the worker unlocks the door. The worker drives the corresponding vehicle 2 and moves the vehicle to a predetermined office. On the other hand, if determining that the corresponding vehicle is not in a safe state, for example, if determining that an accident has occurred, the worker secures the safety of the site and promptly calls the police, then makes a report to the manager about the status and takes appropriate measures in cooperation with the manager.

A point system may be used to encourage users to properly return vehicles to a predetermined parking area specified at the time of reservation. If the vehicle is returned to the specified parking area in time as reserved, the user is given predetermined points, which can be used to get a discount in the next reservation. Conversely, if the certain vehicle is used without an advance registration of an extended use period, if an extended use period is not registered after a predetermined period or longer elapses, or if the user does not pay the charge after a predetermined period or longer elapses, an overdue fee is added as an extra charge according to the use condition. When the manager makes arrangement to retrieve the vehicle, the user is charged for the retrieval expense.

The case of car lease will now be described. Before shipment of vehicles, the engine starting external relay 20 of the vehicle is set to the starting-enabled state so as to enable starting of the vehicle. The server 3 determines whether the user of each vehicle has paid the charge within a predetermined period, based on data from the finance institution. When the charge is not paid within the predetermined period, the vehicle operation status is checked. If the vehicle operation status satisfies a predetermined condition, the server 3 transmits an engine starting relay control command corresponding to the starting-disabled state from the remote control instruction unit 31 to the corresponding vehicle-mounted device 1 in order to set the corresponding vehicle 2 to the starting-disabled state. The vehicle-mounted device 1, receiving the engine starting relay control command corresponding to the starting-disabled state, switches the engine starting external relay 20 to the starting-disabled state to bring the corresponding vehicle 2 into the starting-disabled state, that is, the engine is in a starting-disabled state in the case of an internal combustion engine vehicle.

On the other hand, without an engine starting relay control command corresponding to the starting-disabled state from the server 3 to the vehicle-mounted device 1, the engine starting external relay 20 is usually set to the starting-enabled state. Thus, when the charge is paid within a predetermined period, an engine starting relay control command corresponding to the starting-disabled state is not transmitted from the server 3 to the vehicle-mounted device 1. The engine starting external relay 20 is therefore continuously set to the starting-enabled state, and the corresponding vehicle 2 is in the starting-enabled state, that is, the engine is in a starting-enabled state in the case of an internal combustion engine vehicle. If the user pays the charge in accordance with a predetermined condition given by the manager after the vehicle enters the starting-disabled state due to failure to pay, the server 3 transmits the engine starting relay control command corresponding to the starting-enabled state from the remote control instruction unit 31 to the corresponding vehicle-mounted device 1 in order to set the corresponding vehicle to the starting-enabled state again. When the vehicle-mounted device 1 receives the engine starting relay control command corresponding to the starting-enabled state, the engine starting external relay 20 is switched to the starting-enabled state to bring the corresponding vehicle into the starting-enabled state.

When the charge is a monthly fee, it is determined whether a predetermined amount of money has been paid, for example, no later than 25th of the previous month. If a predetermined amount has not been paid, a message is transmitted to the user to indicate that the user is delinquent in payment and if a predetermined charge fails to be paid within one week, the vehicle will be set to the starting-disabled state. If a predetermined charge is not paid within one week from transmission of this message, the server 3 checks the vehicle operation status. If the vehicle operation status satisfies a predetermined condition, the server 3 transmits an engine starting relay control command corresponding to the starting-disabled state from the remote control instruction unit 31 to the corresponding vehicle-mounted device 1. If the user does not pay a predetermined charge after the elapse of a predetermined period, for example, one month since the vehicle was set to the starting disabled state, the manager makes arrangement to retrieve the vehicle, using the position information on the certain vehicle acquired by the vehicle information acquisition unit 32.

On the other hand, if payment of a predetermined amount of money by the user is confirmed within the predetermined period after the engine starting relay control command corresponding to the starting-disabled state is transmitted to the vehicle-mounted device 1, the server 3 transmits an engine starting relay control command corresponding to the starting-enabled state from the remote control instruction unit 31 to the corresponding vehicle-mounted device 1 to set the vehicle to the starting-enabled state again. Without an engine starting relay control command corresponding to the stating-disablement from the server 3 to the vehicle-mounted device 1, the engine starting external relay 20 is usually set to the starting-enabled state, and thus the corresponding vehicle is set to the starting-enabled state. Accordingly, the user can use the vehicle kept in the starting-enabled state as long as the user has paid a predetermined charge no later than 25th every month.

A description is given of the predetermined condition in the aforementioned case in which the server 3 transmits an engine starting relay control command corresponding to the starting-disabled state from the remote control instruction unit 31 to the corresponding vehicle-mounted device 1 under the condition that the predetermined condition is satisfied. In setting the vehicle 2 to the starting-disabled state, it is necessary to consider the operation state of the vehicle. That is, switching to the starting-disabled state while the user is moving in a vehicle may produce a severe situation for the user and, in addition, may cause a hinderance to the other traffic. Moreover, as will be described later, switching to the starting-disabled state of the engine starting external relay in the power-on state of the vehicle may cause trouble depending on the kind of vehicles, and some conditions to be avoided may exist in view of safety. Here, a description will be made, with examples, of a case in which the server 3 automatically determines the vehicle operation state and switches the vehicle to the starting-disabled state and a case in which the switching to the starting-disabled state is deferred.

For example, the server 3 checks the vehicle operation status from the GPS position information and the vehicle power on/off information acquired from the vehicle, determines that the vehicle is parked at a predetermined parking area under the condition that the power of the vehicle is off and the vehicle is in a predetermined parking area, and transmits an engine starting relay control command to set the engine starting external relay 20 to the starting-disabled state to the vehicle-mounted device 1 on the corresponding vehicle 2, thereby switching the vehicle 2 to the starting-disabled state. In this case, because the vehicle 2 is parked at a predetermined parking area, there is no possibility that the other traffic is hindered.

For example, the server 3 checks the vehicle operation status and, if the power of the vehicle is on or the vehicle is in a place that is not a predetermined parking area, determines that the user is using the vehicle, and defers transmitting an engine starting relay control command for switching the engine starting external relay 20 to the starting-disabled state to the vehicle-mounted device 1 of the corresponding vehicle. In this way, in the present invention, the vehicle-mounted device 1 is configured to determine the safety as will be described later, and thus the determination in the server 3 can be relatively simplified.

In the example described here, the server automatically performs all of: the management of reservation from users; the determination as to whether each user has paid a predetermined charge within a predetermined period; the transmission of a message to the user; the determination as to the operation state of the vehicle; the determination as to transmission of an engine starting relay control command corresponding to the starting-disabled state and the starting-enabled state; and the inquiry to the user and reporting to the police in the event of theft or abnormality. However, some or all of the determinations may be performed manually by the manager from the manager terminal 35.

Figure 2:
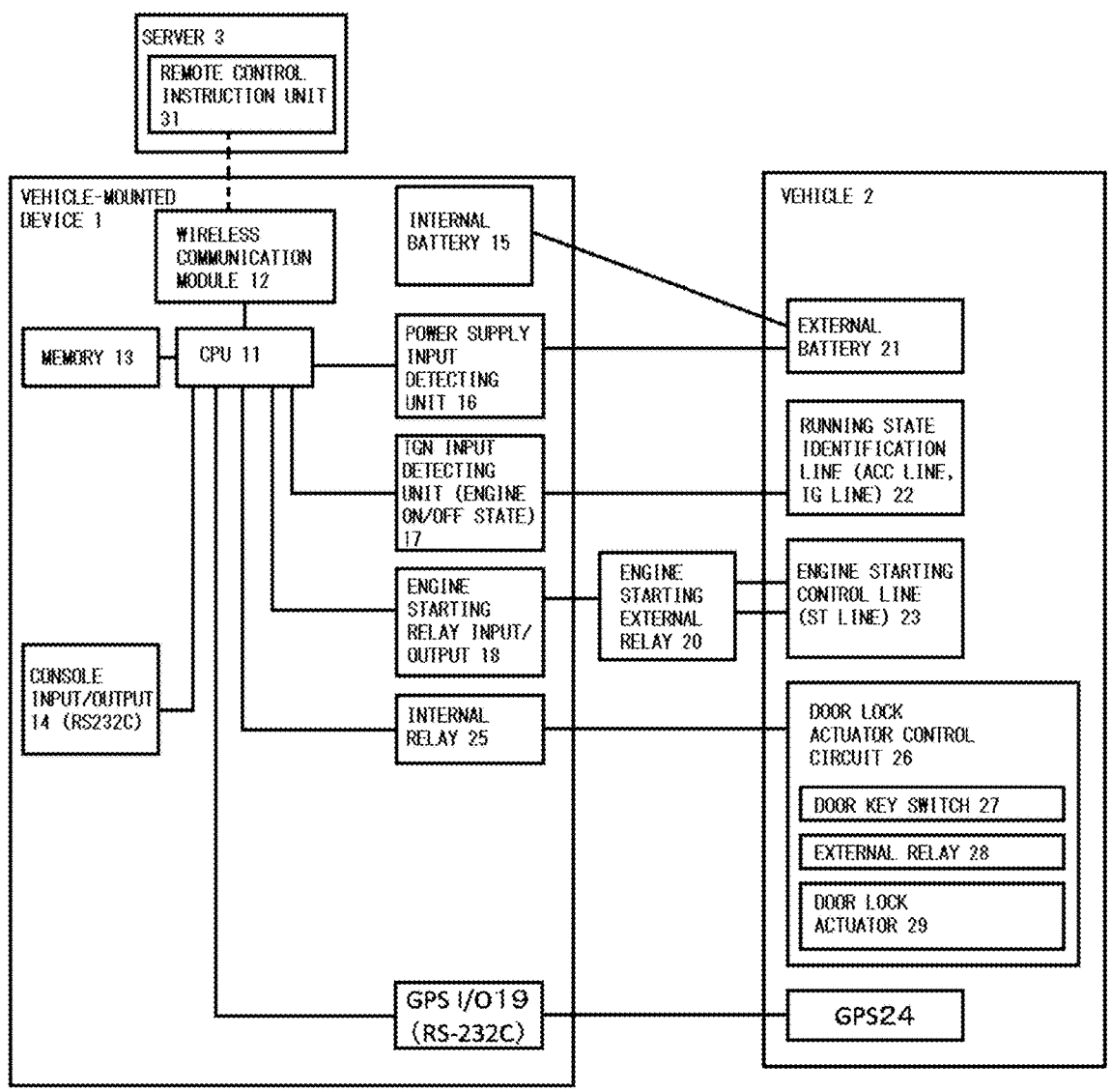
FIG. 2 is block diagram of a vehicle-mounted device according to the first embodiment.

The configuration of the vehicle-mounted device 1 and the connection to the vehicle 2 will now be described with reference to FIG. 2. FIG. 2 is a block diagram of the vehicle-mounted device connected to an internal combustion engine vehicle as an example. The same components as in FIG. 1 are denoted with the same reference signs and will not be further described.

FIG. 2 illustrates a CPU 11 for arithmetic operations, a wireless communication module 12 for communicating by radio with the transmission/reception unit of the server 3 through a wireless communication network, a memory 13 configured, for example, as a nonvolatile memory for storing a state of the engine starting relay, a console input/output 14 serving as an input/output unit of a console for making a variety of settings for the vehicle-mounted device, an internal battery 15 which is a battery inside the vehicle-mounted device to be charged with power from an external battery 21 of the vehicle 2, a power supply input detecting unit 16 for detecting power supply input from the external battery 21 of the vehicle 2, an IGN input detecting unit 17 connected to a running state identification line (ACC line, IG line) 22 of the vehicle 2 for detecting the on/off state of the engine, an engine starting relay input/output 18 connected to the engine starting external relay 20, a GPS input/output unit 19 connected to a GPS 24 of the vehicle 2 for detecting the vehicle position information (denoted as GPSI/O in FIG. 2), and an internal relay 25 connected to a door lock actuator control circuit 26 for controlling the door lock actuator 29 through an external relay 28. Although not illustrated, the vehicle-mounted device 1 may include a door lock detection circuit for detecting the status of door lock and an acceleration sensor. The vehicle-mounted device 1 may be configured to detect vehicle speed pulse and fuel sensor information. Here, the external battery 21 refers to the term distinguished from the internal battery 15 inside the vehicle-mounted device 1 and means an on-vehicle battery. The engine starting external relay 20 is connected to the engine starting control line (ST line) of the vehicle 2. Although the engine starting external relay 20 is illustrated between the vehicle 2 and the vehicle-mounted device 1 in FIG. 2, the engine starting external relay 20 is actually provided in the inside of the engine compartment of the vehicle 2 and disposed at a place visually hidden from the outside. The engine starting external relay 20 is thus a structure unable to be removed on purpose by a theft or a user. The engine starting relay input/output engine starting relay input/output 18 detects whether the engine starting external relay 20 is in the starting-disabled state or in the starting-enabled state and performs control such that the engine starting external relay 20 is switched to the starting-disabled state or the starting-enabled state based on an engine starting relay control command.

The power supply input detecting unit 16 is connected with the external battery 21, the IGN input detecting unit 17 is connected with the running state identification line 22, the engine starting relay input/output 18 is connected with the engine starting external relay 20, the GPS input/output unit 19 is connected with the GPS 24, and the internal relay 25 is connected with the door lock actuator circuit 26, each directly through individual wires, not through a vehicle LAN such as CAN. Because a vehicle LAN such as CAN is not used, there is no problem of the vulnerability to security risk as is the case in a vehicle LAN such as CAN.

The vehicle-mounted device 1 is driven by electric power of the internal battery 15. The internal battery is always charged with electric power of the external battery 21 of the vehicle 2 and can continuously drive the vehicle-mounted device for a predetermined time even in the event of abnormality such as when the vehicle-mounted device 1 is removed or when the charge line is cut off or removed. For this reason, the server 3 can be notified of the occurrence of abnormality together with the present location information. The latest present location information and other information are stored in the memory 13.

The CPU 11 is connected to the wireless communication module 12, the memory 13, the console input/output 14, the internal battery 15, the power supply input detecting unit 16, the IGN input detecting unit 17, the engine starting relay input/output 18, the GPS input/output unit 19, the internal relay 25, a not-illustrated door lock detecting circuit, and a not-illustrated acceleration sensor. The power supply input detecting unit 16, the IGN input detecting unit 17, the GPS input/output unit 19, the door lock detecting circuit, and the acceleration sensor are provided as vehicle information detecting means. The engine starting relay input/output 18 detects a state of the engine starting external relay 20 and controls the engine starting external relay 20 to one of the starting-disabled state and the starting-enabled state. The state of the engine starting external relay 20 is also usable as the vehicle information.

The door lock actuator control circuit 26 is a circuit including a door key switch 27, the external relay 28, and the door lock actuator 29. The door key switch 27 is a switch operated by, for example, a mechanical key or a smart key for locking and unlocking the door by controlling the door lock actuator 29. The door lock actuator control circuit 26 includes a circuit capable of locking and unlocking the door by controlling the external relay 28 and the door lock actuator 29 through the operation of the internal relay 25, in addition to the operation of the door key switch 27.

<Carsharing System>

Figure 3:
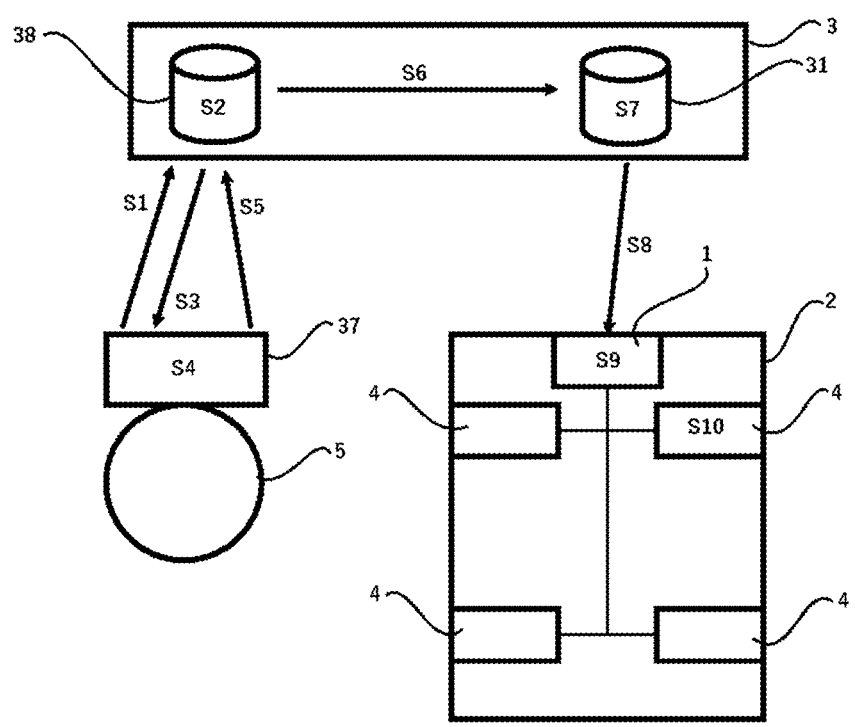
FIG. 3 is a conceptual diagram of a carsharing system according to the first embodiment.

Referring now to FIG. 3, a description is given of a system for locking and unlocking the door of the vehicle 2 through the server 3 in response to a lock command or an unlock command from the user terminal 37 in an example of carsharing. FIG. 3 is a conceptual diagram of the carsharing system. The procedure of reserving a certain vehicle 2 from the user terminal 37 and unlocking the door of the certain vehicle 2 is described first. A plurality of offices (for example, manned or unmanned parking areas) are registered as parking areas where a user 5 picks up and returns a vehicle. The user information management system manages the reservation status of vehicles, the vehicle allocation status for each office, etc. The user communicates with the user information management unit 38 for reserving the certain vehicle 2 using the user terminal 37 and specifies the period of use (the year, month, day, and time of beginning of use, and the year, month, day, and time of return), the office to pick up the vehicle, and the office to return the vehicle (S1).

The user information management unit 38 checks whether the vehicle can be allocated as specified by the user 5 and replies to the user terminal 37 as to whether the vehicle can be reserved. If it can be reserved, the user information management unit 38 asks the user terminal to pay the charge, for example, by credit card. When a predetermined charge is paid by the user terminal 37, the reservation is fixed (S2). When the reservation is fixed, the user information management unit 38 transmits the reservation information to the user terminal. On the other hand, if the vehicle is unable to be allocated as specified by the user 5, the user terminal 37 is notified that the vehicle is unable to be reserved. At this time, the user information management unit 38 can offer a plurality of other available conditions similar to those previously specified.

When the reservation is fixed, the user information management unit 38 transmits door lock key information and vehicle specification information (for example, office location, license plate number, etc.) to the user terminal 37 (S3). The user terminal 37 receives the door lock key information and vehicle number information (S4). The timing at which the user terminal 37 receives the door lock key information from the user information management unit 38 may be, for example, 10 minutes before the reservation start time. However, the present invention is not limited thereto, and the timing may be any point of time after fixation of the reservation and before the reservation start time.

At the reservation start time or shortly before the start time (for example, 10 minutes before), the user 5 transmits an unlock command using door lock key information from the user terminal 37 to the user information management unit 38, near the reserved vehicle 2 at the reserved office (S5). At this point of time, the information transmitted from the user terminal 37 to the user information management unit 38 may include, in addition to door lock key information, user ID, reservation code, and position information on the user terminal 37 acquired from, for example, the GPS. The user information management unit 38 checks the user ID and the reservation code and then transmits an unlock command to the reserved certain vehicle, to the remote control instruction unit 31 (S6). At this point of time, it is preferable that whether the unlock command is valid or invalid is decided by determining whether the user 5 is near the reserved vehicle 2 based on, for example, the position information on the user terminal 37 acquired from the GPS.

The position of the reserved vehicle 2 can be grasped from the position information on the reserved vehicle 2 acquired by the vehicle information acquisition unit 32 from the GPS mounted on the reserved vehicle 2. The position of the user terminal 37 can be grasped from the position information acquired from the GPS of the user terminal 37 transmitted from the user terminal together with the unlock command. If the position of the user terminal 37 is close to the position of the reserved vehicle 2, that is, if the position of the user terminal 37 is within a predetermined distance from the position of the reserved vehicle 2, it is determined that the user is near the reserved vehicle 2 and it is determined that the unlock command transmitted from the user terminal to the user information management unit 38 is valid. On the other hand, if the position of the user terminal 37 is far from the position of the reserved vehicle 2, that is, if the position of the user terminal 37 is not within a predetermined distance from the position of the reserved vehicle 2, it is determined that the user is distant from the reserved vehicle 2 and it is determined that the unlock command transmitted from the user terminal to the user information management unit 38 is invalid.

In a state in which the reserved vehicle 2 is at the pick-up office specified at the time of reservation, the user information management unit 38 determines that the unlock command from the user terminal 37 is valid after the reservation start time of the reserved vehicle 2 or from shortly before the reservation start time (for example, 10 minutes before) to the reservation end time, but determines that the unlock command is invalid earlier than the reservation time (for example, 10 minutes or more earlier) and after the reservation end time.

If it is determined that the unlock command from the user terminal 37 is valid, the user information management unit 38 transmits to the remote control instruction unit 31, a door unlock instruction to transmit an unlock command to the reserved vehicle 2. On the other hand, if it is determined that the unlock command from the user terminal 37 is invalid, the user information management unit 38 transmits a message indicating that it is determined that the unlock command is invalid, to the user terminal 37.

The remote control instruction unit 31 checks the status of the reserved vehicle 2 acquired by the vehicle information acquisition unit 32 and determines whether the vehicle is available for renting, before an unlock command is transmitted to the reserved vehicle 2 (S7). For example, when the engine is running, the unlock command is disabled, and a message indicating the vehicle is unable to be rented is transmitted to the user terminal through the user information management unit 38. In addition, the user information management unit 38 searches for information on alternative vehicles and provides the user terminal 37 with information on an alternative vehicle. On the other hand, the remote control instruction unit 31 checks the status of a certain vehicle 2 and, if the vehicle is available, transmits an unlock command to the vehicle-mounted device 1 on the certain vehicle 2 (S8).

In the vehicle-mounted device 1, the internal relay 25 is controlled for activation for a predetermined time (for example, about 0.1 to 0.2 seconds) to control the external relay 28 (S9). When the external relay 28 is switched, the door lock actuator 29 is driven, and a door lock 4 is opened (S10). Here, the door locks 4 for all of the doors of the certain vehicle may be opened. However, the present invention is not limited thereto. For example, only the door lock 4 of the door at the driver's seat may be opened or the door locks 4 of the front and back doors on the driver's seat side may be opened.

An operation key such as a mechanical key and a smart key is stored in a predetermined place in the vehicle 2. Once the door lock is opened by an unlock command, the user can use the usual operation key to use the reserved vehicle 2.

The procedure of stopping using the reserved vehicle 2 and returning the reserved vehicle 2 to the parking area of the office specified at the time of reservation will be described. The engine is stopped in a state in which the reserved vehicle 2 is parked in the parking area of the office specified at the time of reservation. After the vehicle is powered off, the operation key is stored in a predetermined place in the vehicle. The user takes out all the belongings and transmits a lock command from the user terminal 37 to the user information management unit 38 when ready for returning the reserved vehicle 2. During use of the reserved vehicle 2, the user can lock and unlock as usual using the operation key such as a mechanical key and a smart key stored in a predetermined place in the vehicle 2. Here, if the operation key is not in a predetermined place, a warning is issued to the user to prompt the user to transmit a lock command again after storing the operation key in a predetermined place. The lock command transmitted from the user terminal 37 may include user ID, reservation code, and the position information on the user terminal 37 acquired, for example, from the GPS. The user information management unit 38 checks the user ID and the reservation code and then transmits to the remote control instruction unit 31, a door lock instruction to transmit a lock command to the reserved vehicle 2. When the reserved vehicle 2 is parked in the parking area of the office specified at the time of reservation and a lock command is transmitted, the user information management unit 38 may not be able to determine whether the user wants to return the reserved vehicle 2 or to keep using the reserved vehicle 2. Then, when grasping that the reserved vehicle 2 is parked in the parking area of the office specified at the time of reservation and a lock command is transmitted, the user information management unit 38 sends a command to lock the reserved vehicle 2 to the remote control command unit 31 and transmits a message, for example, "Do you want to return the vehicle? (Y/N)" to the user terminal 37 to confirm the user's intention to return the vehicle. The user terminal 37 may include vehicle return operation means apart from lock command operation means. When the user operates the vehicle return operation means of the user terminal 37, the vehicle user information management unit 38 determines that the user has the will to return the vehicle, then sends a command to lock the reserved vehicle 2 to the remote control command unit 31, and transmits a message, for example "Vehicle return processing has completed. (If you want to keep using the vehicle, press this button within five minutes)" to the user terminal 37. After it is confirmed that the operation on the vehicle return button is correct, return processing is performed.

Here, the position of the reserved vehicle 2 can be grasped from the position information on the reserved vehicle 2 acquired by the vehicle information acquisition unit 32 from the GPS mounted on the reserved vehicle 2. The position of the user terminal 37 can be grasped from the position information obtained from the GPS, for example, of the user terminal 37 that is transmitted from the user terminal 37 together with an unlock command. If the parking position of the reserved vehicle 2 is different from the parking position of the office specified at the time of reservation, the user information management unit 38 transmits a message indicating that the parking position is different from the return location to the user terminal 37 to alert the user 5.

If the position of the user terminal 37 is far away from the position of the reserved vehicle 2, it may be determined that the lock command is invalid. This is to avoid the risk caused by locking the reserved vehicle 2 in a state in which the user fails to visually check the state of the reserved vehicle 2, for example, the risk of trapping the passenger in the vehicle. If it is determined that the lock command is invalid, the user information management unit 38 transmits a message indicating that it is determined that the lock command is invalid to the user terminal 37 to alert the user 5. On the other hand, if the position of the user terminal 37 is close to the position of the reserved vehicle 2, it is determined that the user 5 is near the reserved vehicle 2 and it is determined that the lock command transmitted from the user terminal to the user information management unit 38 is valid. If it is determined that the lock command is valid, the user information management unit 38 transmits a door lock instruction to transmit a lock command to the vehicle 2 for reservation to the remote control instruction unit 31.

The remote control instruction unit 31, receiving the door lock instruction from the user information management unit 38, checks the status of the certain vehicle 2 acquired by the vehicle information acquisition unit 32 and determines whether the door can be locked, before transmitting an unlock command to the certain vehicle 2 for reservation. For example, when the engine is running, the lock command is disabled, and a message indicating that the door is unable to be locked is transmitted to the user terminal through the user information management unit 38 to alert the user 5. On the other hand, the remote control instruction unit 31 checks the status of the certain vehicle 2 and, if the door can be locked, transmits a lock command to the vehicle-mounted device 1 of the certain vehicle 2.

In the vehicle-mounted device 1, receiving the lock command from the remote control instruction unit 31, the internal relay 25 is controlled for activation for a predetermined time (for example, 0.1 to 0.2 seconds) to control the external relay 28. When the external relay 28 is switched, the door lock actuator 29 is driven and the door lock 4 is closed. At this point of time, the door locks 4 for all the doors of the vehicle can be closed. Which door to lock or not to lock can be decided as desired.

Upon detecting that the vehicle 2 is parked at the return office registered at the time of reservation, based on the position information on the vehicle 2 from the vehicle information acquisition unit 32, the user information management unit 38 displays a message on the user terminal 37 to prompt a lock command from the user terminal 37 to the user information management unit 38. Finally, at the point of time when locking of the reserved vehicle 2 is completed, it is assumed that the return of the reserved vehicle 2 has completed, and the user information management unit 38 transmits a message indicating completion of the return processing to the user terminal 37.

In carsharing, the user may want to extend the use period due to unavoidable reasons such as traffic conditions. In the case in which the user 5 wants to extend the reserved use period, the user can register an extended use period to the user information management unit 38 in advance from the user terminal 37, as previously mentioned. As previously mentioned, a point system may be employed to encourage proper return to the parking area specified in advance at the time of reservation. Conversely, in the case in which the vehicle is used without an advance registration of an extended use period, in the case in which an extended use period is not registered after a predetermined period or longer elapses, or in the case in which the user does not pay the charge after a predetermined time or longer elapses, for example, an overdue fee may be added as an extra charge according to the use condition. Setting the overdue fee in proportion to the overtime can prompt the user 5 to return the vehicle to a predetermined office within the reservation period. The user information management unit 38 allocates vehicles with enough time so as to prevent overbooking by a plurality of users. In case a vehicle fails to be allocated as scheduled due to the extended use period or other reasons, the user information management unit 38 sends a message to the user terminal 37 in advance to indicate that the vehicle fails to be allocated as scheduled and proposes an alternative car plan to the user terminal 37.

Since the door lock key information varies with reservation, the lock command and the unlock command to the same vehicle from the same user terminal 37 are disabled after the end of the reservation period. However, if an extended use period is registered, the same door lock key information is enabled for the extended period.

It is preferable that the carsharing offices (for example, manned or unmanned parking areas) are located where the radio wave condition is good for communication between the wireless communication network 34 and the user terminal 37. This is because the poor radio wave condition may hinder the communication between the user terminal 37 and the server 3 or the communication between the server 3 and the vehicle-mounted device 1 to prevent appropriate transmission of a lock command and an unlock command as well as information to be exchanged in association therewith, causing trouble in locking and unlocking of the certain vehicle 2 and transmission of information to the user terminal. As long as the radio wave condition in carsharing offices is ensured, the user 5 does not have to be concerned about the radio wave condition of wireless communication during use of the certain vehicle 2. That is, during use of the certain vehicle 2, the user can lock and unlock as usual using the operation key such as a mechanical key and a smart key stored in a predetermined place in the vehicle 2.

Even if the user 5 has lost or left the user terminal 37 at home or other place, and the user 5 uses any other means to allow the server 3 to authenticate the user 5 and confirm the reservation, the manager or a responsible person in the carsharing office can transmit a lock command and an unlock command to the vehicle-mounted device 1 through the server 3 to lock and unlock the door.

Although the carsharing system has been described above, a similar system is applicable to car rental. Locking and unlocking the vehicle 2 from the user terminal 37 through the server 3 is applicable to car lease and other services.

<Door Locking and Unlocking Operation by Internal Relay and External Relay>

Referring to FIG. 4, the operation of the internal relay and the external relay will be described. FIG. 4 is a wiring diagram of the door lock actuator control circuit 26 according to the first embodiment. In this circuit, a locking line 63 is connected to the ground to lock or unlock the door. The vehicle-mounted device 1 including a first internal relay 61 and a second internal relay 62 is connected between a door key lock switch 85 and a door key unlock switch 86 and a door lock actuator 29. The door lock actuator 29 can be controlled through a first external relay 65 and a second external relay 75 by operating the first internal relay 61 and the second internal relay 62 of the vehicle-mounted device 1.

The door lock actuator 29 is, for example, a direct-current (DC) motor capable of forward/reverse rotation. Both ends of the DC motor are connected to the locking line 63 and an unlocking line 64 to which normally a 12-V power supply is applied. The locking line 63 is connected to a terminal 70 of the first external relay. The unlocking line 64 is connected to a terminal 80 of the second external relay 75. A switch contact 67 connected to the terminal 70 of the first external relay is mechanically biased toward a terminal 71 normally connected to the 12-V power supply. When a coil 66 is energized, the contact 67 is switched to a terminal 72 connected to the ground. A terminal 68 at one end of the coil 66 is connected to the 12-V power supply similarly to the terminal 71. A terminal 69 at the other end of the coil 66 is connected to one end of the door key lock switch 85 serving as a normally open switch, and the other end of the door key lock switch 85 is connected to the ground. One end of the door key lock switch 85 is connected to one end of the first internal relay serving as a normally open switch, and the other end of the first internal relay 61 is connected to the ground.

A switch contact 77 connected to the terminal 80 of the second external relay is mechanically biased toward a terminal 81 normally connected to the 12-V power supply. When a coil 76 is energized, the contact 77 is switched to a terminal 82 connected to the ground. A terminal 78 at one end of the coil 76 is connected to the 12-V power supply, similarly to the terminal 81. A terminal 79 at the other end of the coil 76 is connected to one end of the door key unlock switch 86 serving as a normally open switch, and the other end of the door key unlock switch 86 is connected to the ground. One end of the door key unlock switch 86 is connected to one end of the second internal relay serving as a normally open switch, and the other end of the second internal relay 62 is connected to the ground.

An unlock command is transmitted from the user terminal 37 to the user information management unit 38. If it is determined that the unlock command from the user terminal 37 is valid, the user information management unit 38 transmits a door unlock instruction to transmit an unlock command to the certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62 serving as a normally open switch is controlled for activation for a predetermined time (for example, about 0.1 to 0.2 seconds). When the second internal relay 62 is activated, the coil 76 of the second external relay 75 is excited, causing the switch contact 77 of the second external relay 75 normally biased toward the 12-V power supply to switch to the terminal 82 connected to the ground. The unlocking line 64 is then connected to the ground through the terminal 80, the switch contact 77, and the terminal 82. Since one end of the DC motor serving as the door lock actuator 29 goes to the ground potential and 12 V is applied to the other end of the DC motor, the DC motor serving as the door lock actuator 29 rotates in the unlocking direction for a predetermined time (for example, about 0.1 to 0.2 seconds) during which the second internal relay 62 serving as a normally open switch is activated, thereby unlocking the door. After the predetermined time during which the second internal relay 62 serving as a normally open switch is activated has passed, the second internal relay 62 is opened, so that the switch contact 77 of the second external relay 75 is biased toward the terminal 81 connected to the 12-V power supply, and the 12-V power supply is applied to both ends of the DC motor serving as the door lock actuator 29, causing the DC motor to stop operating.

On the other hand, when a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2. In the vehicle-mounted device 1, receiving the lock command from the remote control instruction unit 31, the first internal relay 61 serving as a normally open switch is activated for a predetermined time (for example, about 0.1 to 0.2 seconds). When the first internal relay 61 is activated, the coil 66 of the first external relay 65 is excited, causing the switch contact 67 of the first external relay 65 normally biased toward the 12-V power supply to switch to the terminal 72 connected to the ground. The locking line 63 is then connected to the ground through the terminal 70, the switch contact 67, and the terminal 72. Since the other end of the DC motor serving as the door lock actuator 29 goes to the ground potential and 12 V is applied to one end of the DC motor, the DC motor serving as the door lock actuator 29 rotates in the locking direction opposite to the aforementioned unlocking direction for a predetermined time (for example, about 0.1 to 0.2 seconds) during which the first internal relay 61 serving as a normally open switch is activated, thereby locking the door. After the predetermined time during which the first internal relay 61 serving as a normally open switch is activated has passed, the first internal relay 61 is opened. Then, the switch contact 67 of the first external relay 65 is biased toward the terminal 71 connected to the 12-V power supply, and 12-V power supply is applied to both ends of the DC motor serving as the door lock actuator 29, causing the DC motor to stop operating.

<Acquisition of Vehicle Information>

The vehicle-mounted device 1 acquires vehicle information at predetermined intervals, for example, every 30 seconds, or when a certain event occurs, for example, when the vehicle power is turned on, or both, and transmits the vehicle information to the server 3. The vehicle information transmitted at this time includes at least one of information on power supply input of the external battery 21 detected by the power supply input detecting unit 16, information on the running state identification line (ACC line, IG line) detected by the IGN input detecting unit 17, for example, information indicating engine on/off, the state of the engine starting external relay 20 detected by the engine starting relay input/output 18, position information from the GPS detected by the GPS input/output unit 19, information on acceleration detected by the not-shown acceleration sensor, information on vehicle speed pulse, information on the fuel sensor, and information on the time when vehicle information is acquired. The speed may be calculated from the GPS position information. The server 3 grasps the vehicle operation status based on such vehicle information.

<Control of Engine Starting External Relay>

When the vehicle-mounted device 1 receives an engine starting relay control command from the server 3, the control value thereof is stored into the memory 13, and the engine starting external relay 20 is controlled to attain a state corresponding to the value. "Vehicle information-associated control means" includes the CPU 11, the memory 13, the IGN input detecting unit 17, and the engine starting relay input/output 18 and, when the engine starting external relay 20 is switched, determines whether to employ an engine starting relay control command or not to employ (ignore an engine starting relay control command), in consideration of the on/off switching timing of power of the vehicle, as will be described later. In the case of an internal combustion engine vehicle, the on/off of the power is detected from, for example, information on the running state identification line (ACC line, IG line) that is detected by the IGN input detecting unit 17, for example, information indicating the on/off state of the engine.

A relay control value (the control value for the ST line relay) in a case in which the engine starting control line (ST line) in an internal combustion engine vehicle is cut by the engine starting external relay 20 (the case in FIG. 2) will now be described with reference to FIGS. 5A and 5B. FIG. 5A illustrates the case of a vehicle type having one engine starting control line, and FIG. 5B illustrates the case of a vehicle type having two engine starting control lines. First, the case of the vehicle type having one engine starting control line in FIG. 5A will be described. The relay value is "0" when the relay A is open, and it is "1" when closed. There are two engine starting external relay control values: "00" and "01". When the engine starting external relay control value is "00", the status is the starting-enabled state (normal) and the vehicle state is starting-enabled. On the other hand, when the engine starting external relay control value is "01", the status is the starting-disabled state and the vehicle state is starting-disabled.

The vehicle type having two engine starting control lines in FIG. 5B will now be described. When each of the relay A and the relay B is open, the relay value is "0", and when closed, the relay value is "1". There are four engine starting external relay control values: "00", "01", "10", and "11". When the engine starting external relay control value is "00", the status is the starting-enabled state (normal) and the vehicle state is starting-enabled. When the engine starting external relay control value is "01", the status is an unintended value and the vehicle state is starting-enabled. When the engine starting external relay control value is "10", the status is an unintended value and the vehicle state is starting-enabled. When the engine starting external relay control value is "11", the status is the starting-disabled state and the vehicle state is starting-disabled.

An "engine starting relay monitoring unit" includes the CPU 11, the memory 13, and the engine starting relay input/output 18 and monitors the relay state when the engine starting external relay control value is supposed to be the starting-enabled state due to a malfunction of firmware, as will be described later. As a result of the monitoring, when the relay state is a state other than the starting-enabled state, the relay state is set to the starting-enabled state, that is, the engine starting external relay control value is set to "00", and the engine starting external relay 20 is set to the starting-enabled state.

Figure 6:
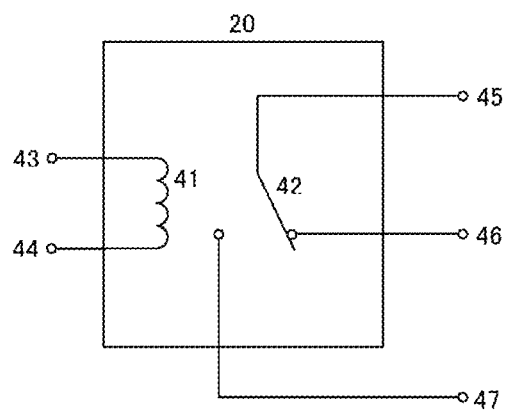
FIG. 6 is an illustration of wiring of a relay.

The wiring of the engine starting external relay 20 will now be described with reference to FIG. 6. Normally open and normally closed can be selected by changing the connection state of the engine starting external relay 20. FIG. 6 illustrates an electromagnetic coil 41, a switch 42, terminals 43 and 44 on the engine starting relay input/output 18 side, one terminal 45 on the engine starting control line (ST line) side, a normally closed terminal 46, and a normally open terminal 47. Because the switch 42 is biased toward the normally closed terminal 46 by a spring, the switch 42 is in contact with the normally closed terminal 46 side when the coil 41 is not energized. When the coil 41 is energized, the switch 42 is attracted to the electromagnet and comes into contact with the normally open terminal 47. Therefore, when the engine starting external relay 20 is intended to be used as the normally closed type, the other terminal of the ST line is connected to the normally closed terminal 46. Conversely, when the engine starting external relay 20 is intended to be used as the normally open type, the other terminal of the ST line is connected to the normally open terminal 47.

The difference between when the engine starting external relay 20 is used as the normally closed type and when the engine starting external relay 20 is used as the normally open type will now be described with reference to FIG. 2. At least one of the power supply input detecting unit 16, the IGN input detecting unit 17, the engine starting relay input/output 18, and the GPS input/output unit 19 is provided with means for detecting cutting-off or removal of wiring (not illustrated). As the means for detecting cutting-off or removal of the wiring, known methods such as using a wiring voltage change associated with cutting-off or removal of wiring, for example, as disclosed in Patent Literature 2 can be used. When the power supply input detecting unit 16 does not detect power supply input from the external battery 21, it can be determined that the wiring between the power supply input detecting unit 16 and the external battery 21 has been cut off or removed. The removal of the vehicle-mounted device can also be detected based on the cutting-off or removal of the wiring. It is determined in advance which control to perform, namely, to set the engine starting external relay 20 to the starting-disabled state (open) or to the starting-enabled state (closed) when cutting-off or removal of the wiring is detected, as will be described later.

When cutting-off or removal of the wiring is detected, the engine starting external relay 20 is controlled as previously mentioned and the server 3 is notified of the abnormality through the wireless communication module 12. When the server 3 receives the notification of the abnormality, the server 3 promptly notifies the manager. When receiving the notification of the abnormality from the server 3, the manager makes contact with the user to check on the occurrence of a theft and then reports theft of the vehicle to the police, if necessary. On the other hand, the vehicle-mounted device 1 gives a notification of the abnormality and also produces an alarm sound using an alarm (not illustrated) mounted on the vehicle-mounted device 1. Instead of an alarm mounted on the vehicle-mounted device 1, the horn, headlamp, blinker, hazard lamp, etc. of the vehicle may be used to produce an alarm. In order to do so, wiring may be connected such that an output signal for alarm output of the vehicle-mounted device 1 is input to the input terminals of the control circuits of the horn, headlamp, blinker, hazard lamp, etc.

Here, detection of cutting-off or removal of the wiring has been described as an example of the notification of abnormality. Alternatively, the vehicle-mounted device 1 may further include failure detecting means, so that when the failure detecting means detects a failure of the vehicle-mounted device 1, the server is notified of the failure of the vehicle-mounted device 1 through the wireless communication module 12. When the server 3 receives the notification of a failure of the vehicle-mounted device 1, the server reports the occurrence of a failure to the manager, and the manager receiving the report makes contact with the user of the corresponding vehicle and makes an arrangement to repair or exchange the vehicle-mounted device 1.

When cutting-off or removal of the wiring occurs between the engine starting relay input/output 18 and the engine starting external relay 20, current supply to the coil 41 of the engine starting external relay 20 is stopped, so that in the case of the normally closed type, the engine starting external relay 20 is closed and the ST line is connected, whereas in the case of the normally open type, the engine starting external relay 20 is open and the ST line is interrupted (cut).

As previously mentioned, the possible cases when the manager removes the vehicle-mounted device 1 from the vehicle 2 are (1) theft by a thief, (2) misuse of the vehicle by the user, and (3) use of the vehicle in an unavoidable and urgent case by the user who has not paid. When the removal of the vehicle-mounted device 1 from the vehicle 2 is assumed as theft or misuse as in (1) and (2), it is desirable to set the vehicle to the starting-disabled state. Therefore, the normally open type is employed as the engine starting external relay 20, and it is determined in advance to control the engine starting external relay 20 to the starting-disabled state (open) also when cutting-off or removal of the wiring is detected. On the other hand, when the removal of the vehicle-mounted device 1 from the vehicle 2 is assumed as an urgent case as in (3), for example, when an emergency patient is to be transported, it is desirable to set the vehicle to the starting-enabled state to allow the use of the vehicle. Therefore, the normally closed type is employed as the engine starting external relay 20, and it is determined in advance to control the engine starting external relay 20 to the starting-enabled state (closed) also when cutting-off or removal of the wiring is detected.

The vehicle-mounted device 1 can fail-safe independently, even in a poor radio wave condition and without an engine starting relay control command from the server 3. For example, this configuration can avoid a situation in which the vehicle enters the starting-disabled state in a place with a poor radio wave condition and becomes unable to receive an engine starting relay control command corresponding to the starting-enable information. The vehicle-mounted device repeatedly retries communication to establish communication when the radio wave condition is poor. When communication fails to be established a predetermined number of times, for example, 20 or more retries in succession, it is determined that the communication has failed, and when the state of the engine starting external relay 20 is the starting-disabled state, switching to the starting-enabled state is performed. This configuration can avoid a situation in which the vehicle is left in the starting-disabled state because an engine starting relay control signal to change to the starting-enabled state is unable to be transmitted from the server 3 in a poor radio wave condition. Whether to employ the process of switching the vehicle to the starting-enabled state at the time of communication failure can be switched at the time of shipment of the vehicle.

<Power Saving Mode>

When the engine of an internal combustion engine vehicle is off, the vehicle-mounted device shifts to a power saving mode to stop the functions except the minimum required functions such as power supply management in order to prevent consumption of power of the external battery 21, after the elapse of a predetermined time, for example, 10 minutes since turning off of the engine. In the power saving mode, the power supply input detecting unit 16, the IGN input detecting unit 17, the engine starting relay input/output 18, and a timer circuit (not illustrated) are always active whereas the other circuits are stopped. During the power saving mode, the vehicle-mounted device 1 does not communicate with the server 3. During the power saving mode, if the power supply input detecting unit 16 detects loss of power supply input, if the IGN input detecting unit 17 detects the on state of the engine (ACC on or IG on), or if the timer circuit counts a predetermined time (for example, every one hour), the corresponding circuit that is always active even in the power saving mode generates an interrupt to the CPU to switch the vehicle-mounted device 1 from the power saving mode to the normal mode. Because the engine starting relay input/output is always supplied with power even in the power saving mode, the state of the engine starting external relay 20 can be always kept.

<Wireless Communication Module>

As previously mentioned, in the normal mode, the vehicle-mounted device 1 acquires vehicle information and transmits the vehicle information to the server 3 at predetermined intervals, for example, every 30 seconds, or at the time of occurrence of a certain event such as when the vehicle power is turned on, or both. When the corresponding circuit that is always active generates an interrupt to the CPU to switch the vehicle-mounted device 1 from the power saving mode to the normal mode, the vehicle-mounted device 1 originates communication with the server 3 to receive an engine starting relay control command or transmit vehicle information. In the normal mode, in addition to communication originating from the vehicle-mounted device 1, the server 3 may originate communication, and the vehicle-mounted device 1 can receive information such as an engine starting relay control command. When a radio wave condition is poor, communication may be retried multiple times, for example, five times until communication is established. Even when the radio wave condition is poor and communication fails to be established, the vehicle-mounted device 1 can operate independently, because the vehicle-mounted device 1 stores an engine starting relay control command received from the server 3 in the latest communication in the memory. Furthermore, because the acquired vehicle information is stored in the memory, the vehicle-mounted device 1 can transmit the acquired information altogether to the server 3 when the communication line is recovered. It is also possible to prevent transmission or reception of the engine starting relay control command corresponding to the starting-disabled state when the radio wave condition is poor. This configuration can avoid the problem of being unable to change from the starting-disabled state to the starting-enabled state because of a poor radio wave condition.

Figure 7:
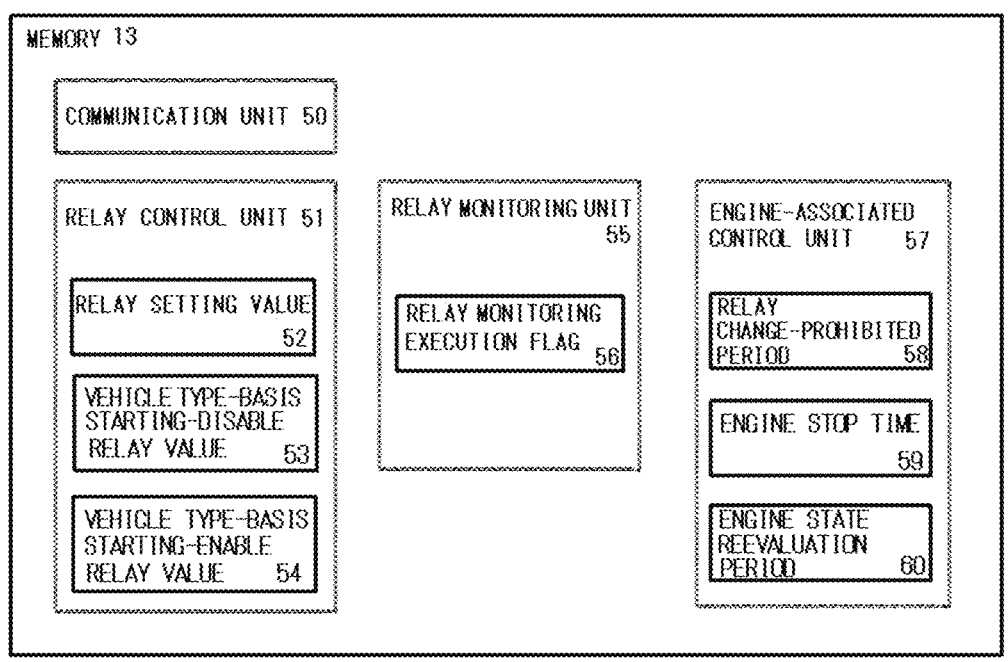
FIG. 7 is an illustration of the configuration in a memory.

A configuration in the memory 13 is now described with reference to FIG. 7. The memory 13 includes four process units: a communication unit 50, an engine starting relay control unit 51, an engine starting relay monitoring unit 55, and an engine-associated control unit 57. The engine starting relay control unit 51 includes an engine starting relay setting value 52, a vehicle type-basis starting-disable relay value 53, and a vehicle type-basis starting-enable relay value 54. The engine starting relay monitoring unit 55 includes an engine starting relay monitoring execution flag 56. The engine-associated control unit 57 includes a relay change-prohibited period 58, an engine stop time 59, and an engine state reevaluation period.

The communication unit 50 is a data region for communication with the server 3 and is used for transmission of vehicle information to the server 3 and reception of an engine starting relay control command from the server 3 through the wireless communication module 12. The engine starting relay control unit is a data region for changing the engine starting external relay 20 to a state corresponding to the relay value provided by the engine starting relay control command from the server 3. The engine starting relay monitoring unit 55 periodically monitors the state of the engine starting external relay 20, based on the relay state value of the starting-disabled state/starting-enabled state set as will be described later, in a situation in which the relay state should be the starting-enabled state, that is, the initial state, or when the last relay change request from the server 3 is to change to the starting-enabled state. As a result of the monitoring, if the engine starting external relay 20 is in a relay state other than the starting-enabled state, the state is changed to the starting-enabled state. The engine-associated control unit 57, receiving an engine starting relay control command from the server 3, ignores the engine starting relay control command if the engine is on for the past X minutes (for example, two minutes), and changes the engine starting relay to the starting-enabled state if the engine on is detected for Y seconds (for example, five seconds) after an engine starting relay control command for the starting-disabled state is executed.

Here, the reason for setting X minutes to, for example, two minutes will be described. The vehicle-mounted device 1 is switched to the power saving mode 10 minutes or so after the engine stops to suppress consumption of electric power. In the state of the power saving mode, when the user gets into the vehicle, inserts the key into the cylinder to start the engine, and turns the ignition into the on state, the IGN input detecting unit 17 detects that the engine is turned into the on state from the running state identification line (ACC line, IG line) 22 and generates an interrupt to the CPU 11 to switch the vehicle-mounted device 1 to the normal mode. It takes about one minute when the radio wave condition is good and takes about one minute and thirty seconds when, because of a poor radio wave condition, the communication has to be retried five times or so until the server 3 recognizes that the vehicle-mounted device 1 has been switched to the normal mode. An engine starting relay control command to issue an instruction to switch to the starting-disabled state is not employed (ignored) for a certain period after the power of the vehicle is turned off, thereby preventing the vehicle from improperly switching to the starting-disabled state when the power of the vehicle is turned on again immediately after the power of the vehicle is turned off. For example, it is possible to prevent the vehicle from improperly switching to the starting-disabled state in a case in which while baggage is still being unloaded from the trunk or the seats in a parking area, the vehicle is temporarily stopped at a position slightly displaced from the parking space, with the power of the vehicle turned off, and baggage is unloaded and then the vehicle is pulled into the parking space by turning on the power of the vehicle again. Conversely, when X minutes is too long, the vehicle may be unable to be switched to the starting-disabled state in some cases. In such situations, it is determined that the engine starting relay control command is to be ignored when the engine is on for the past two minutes. Thus, X minutes can be determined as appropriate depending on specific performance of the server 3.

The reason for setting Y seconds to, for example, five seconds will now be described. When an engine starting relay control command is received while the power of the vehicle is on, the vehicle-mounted device 1 does not accept an engine starting relay control command (ignores an engine starting relay control command), in consideration of safety. While the power of the vehicle is on, the user is moving in a vehicle. Thus, improper switching of the vehicle to the starting-disabled state is prevented, for example, when reception of an engine starting relay control command to change the vehicle to the starting-disabled state is delayed due to a poor radio wave condition. On the other hand, it takes about three seconds for the vehicle-mounted device 1 to recognize the starting of the vehicle after the vehicle is actually started. If the vehicle-mounted device 1 receives an engine starting relay control command immediately after the vehicle is started, the vehicle-mounted device 1 determines that the vehicle is not started and then employs the engine starting relay control command, so that the vehicle is switched to the starting-disabled state although the vehicle is started. As will be described later, when the ignition switch is a push button switch, the starting-disabled state is set by invalidating the push button or by activating the immobilizer (cutting the line for authentication). Of these methods, in the case of invalidating the push button, if switching to the starting-disabled state occurs in the three seconds, the engine is unable to be turned off. On the other hand, in the case of activating the immobilizer, if switching to the starting-disabled state occurs in the three seconds, the push button works to allow the engine to be turned off but the gear lever will not shift to D. Based on the foregoing, three seconds plus a margin, that is, five seconds is employed as Y seconds. Y seconds thus can be determined depending on specific performance of the vehicle-mounted device 1.

The variables of the memory 13 illustrated in FIG. 7 will now be described. The engine starting relay setting value 52 is a relay value corresponding to the present state of the engine starting external relay 20. The vehicle type-basis starting-disable relay value 53 is a setting value for each vehicle type corresponding to the state of the engine starting external relay 20 for setting the vehicle to the starting-disabled state. The vehicle type-basis starting-enable relay value 54 is a setting value for each vehicle type corresponding to the state of the engine starting external relay 20 for setting the vehicle to the starting-enabled state. The engine starting relay monitoring execution flag 56 is a flag for determining whether to execute monitoring of the engine starting external relay 20 and is turned on in the initial state (at the time of shipment of the vehicle) or when the last engine starting relay control command from the server 3 is to change to the starting-enabled state. The relay change-prohibited period is a period (X minutes, for example, two minutes) during which change of the engine starting external relay 20 is prohibited after the engine is stopped. The engine stop time is the time when the previous engine stop is detected. The engine state reevaluation period is a period (Y seconds, for example, five seconds) during which the engine on is reevaluated after the control to set the starting-disabled state is performed.

One of the vehicle type-basis starting-disable relay value 53 and the vehicle type-basis starting-enable relay value 54 may be stored according to the type of the vehicle. Alternatively, values of different vehicle types may be stored in advance and one of them may be selected according to the type of the vehicle. The vehicle type-basis starting-disable relay value 53 and the vehicle type-basis starting-enable relay value 54 may be set from the console input/output 14 or may be set from the server 3. In terms of fail-safe prevention of noise, it is preferable that the relay values are set from the server 3.

Figure 8:
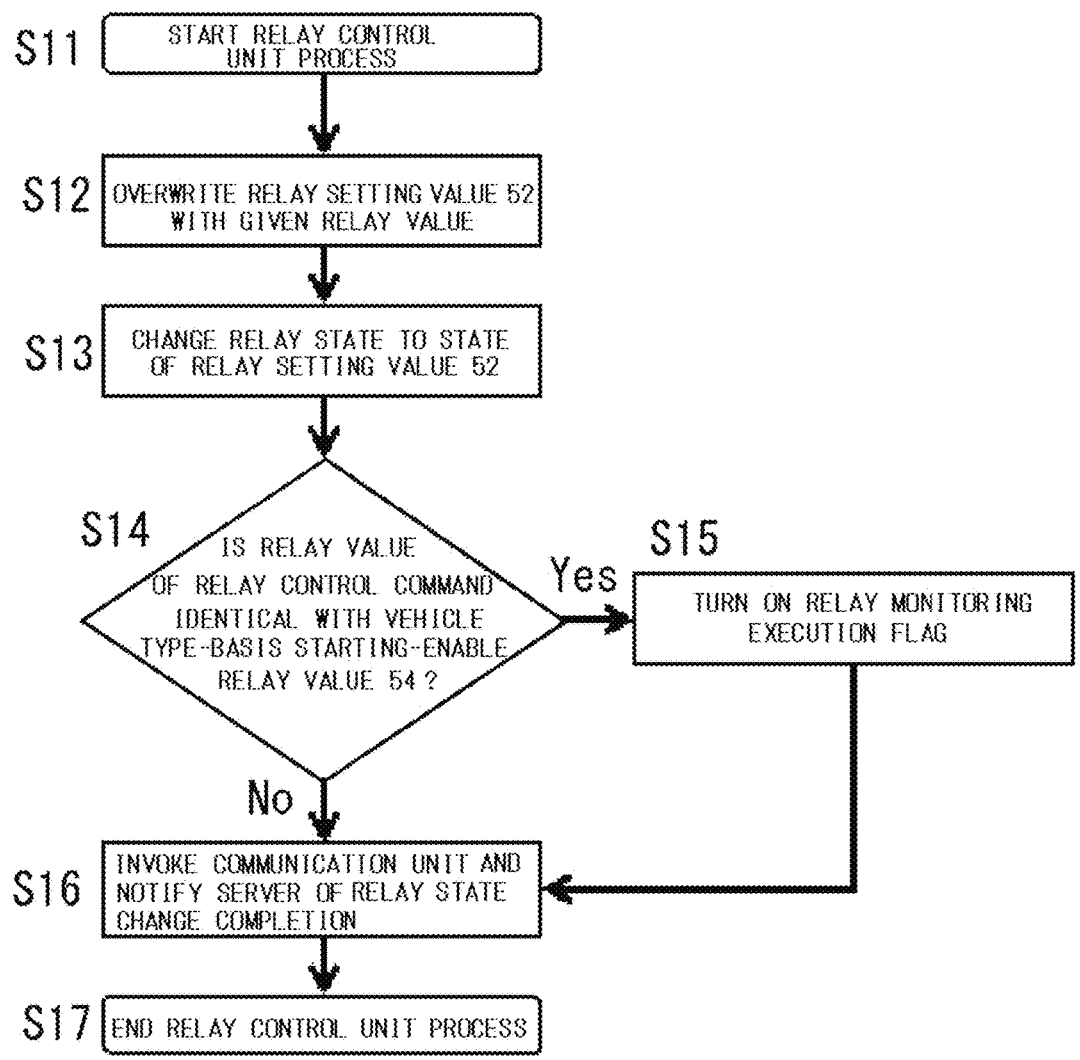
FIG. 8 is a flowchart of a relay control unit.
Figure 9:
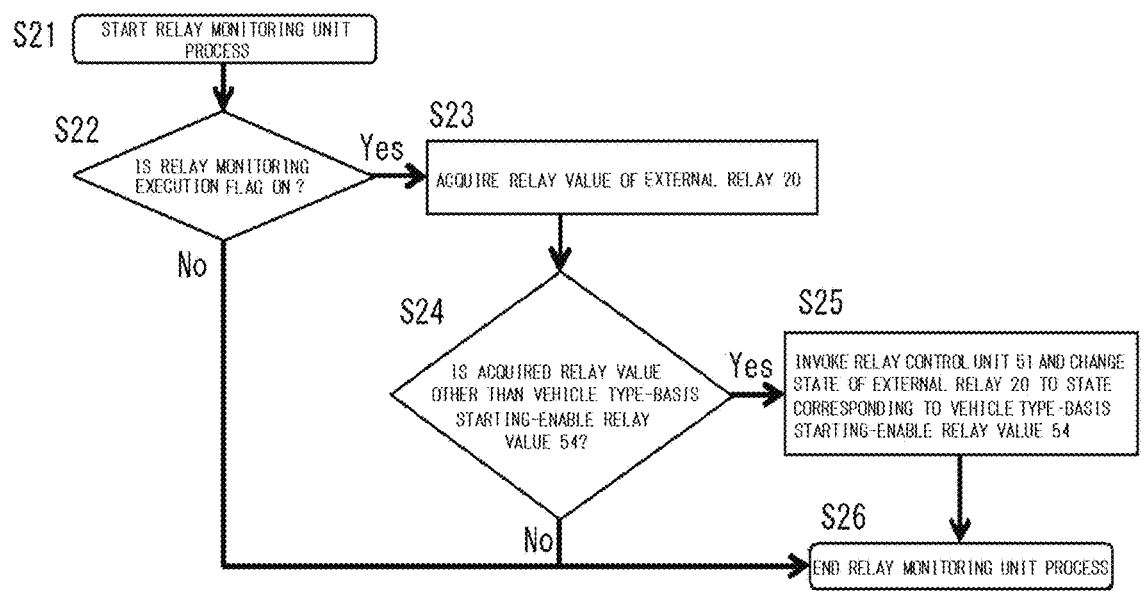
FIG. 9 is a flowchart of a relay monitoring unit.
Figure 10:
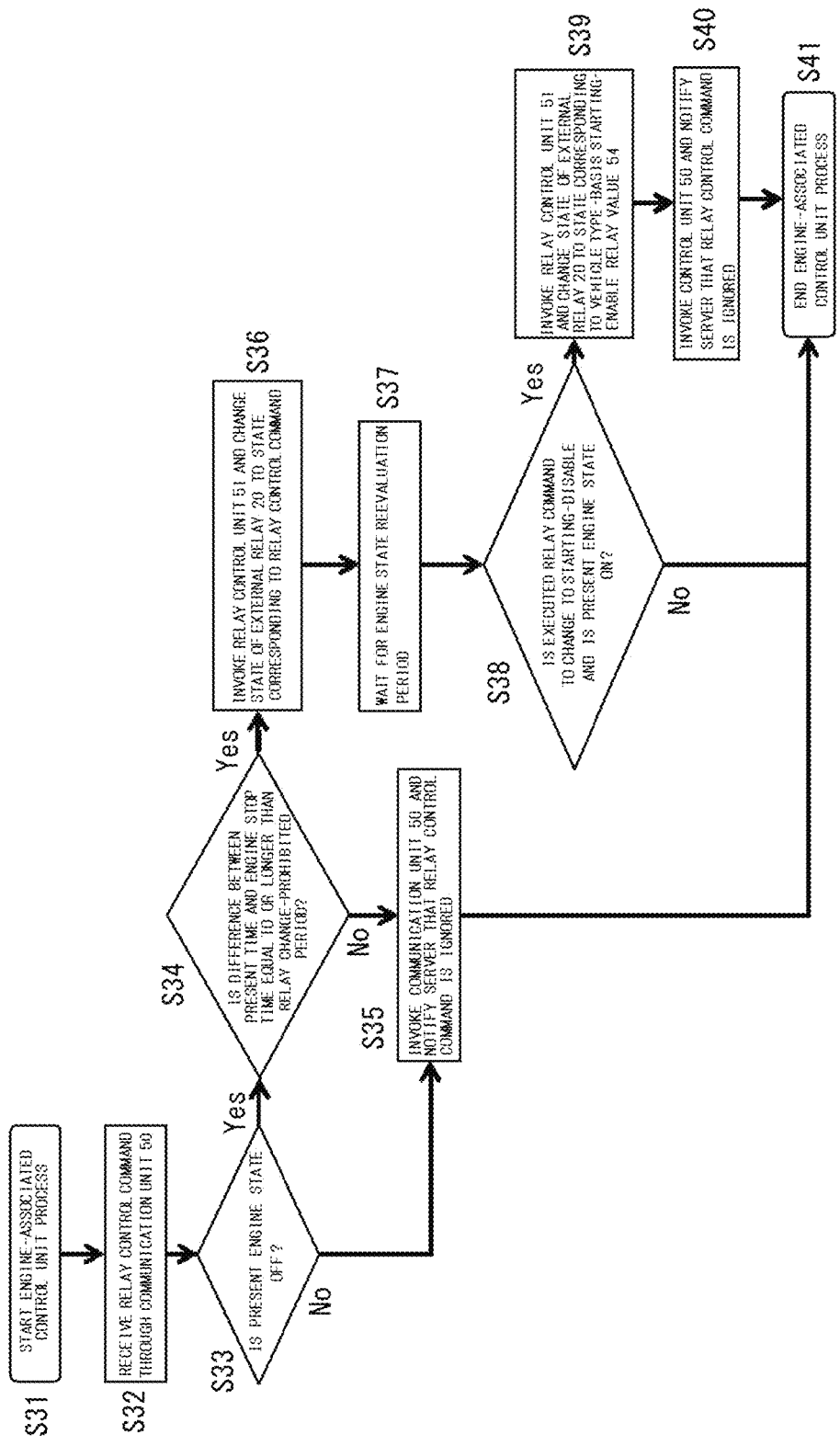
FIG. 10 is a flowchart of an engine-associated control unit.

The operation of each process units of the memory 13 will now be described with reference to the flowcharts in FIG. 8 to FIG. 10. First, the operation of the engine starting relay control unit 51 is described with reference to FIG. 8. When the engine starting relay control unit process is started in S11, first, in S12, the engine starting relay setting value 52 is overwritten with a given relay value. Next, in S13, the relay state of the engine starting external relay 20 is changed to the state of the engine starting relay setting value 52. Then, in S14, it is determined whether the relay value of the engine starting relay control command is identical with the vehicle type-basis starting-enable relay value 54. If Yes, the process proceeds to S15 to turn on the engine starting relay monitoring execution flag 56, and then proceeds to S16. If No in the determination in S14, the process proceeds to S16 to invoke the communication unit and notify the server 3 that the engine starting relay state change is completed. Subsequently, in S17, the engine starting relay control unit process ends. The engine starting relay control unit 51 is invoked in S25 of the engine starting relay monitoring unit 55 in FIG. 9 described later and in S36 of the engine-associated control unit 57 in FIG. 8 described later to start processing.

The operation of the engine starting relay monitoring unit is now described with reference to FIG. 9. When the engine starting relay monitoring unit process is started in S21, first, in S22, it is determined whether the engine starting relay monitoring execution flag 56 is on. As described above, the engine starting relay monitoring execution flag 56 is a flag for determining whether to execute monitoring of the engine starting external relay 20 and is set on in the initial state (at the time of shipment of the vehicle) or when the last engine starting relay control command from the server 3 is to change to the starting-enabled state. If the determination in S22 is Yes, the process proceeds to S23 and, after the relay state of the engine starting external relay 20 is acquired, proceeds to S24. On the other hand, if the determination in S22 is No, the process proceeds to S26 to terminate the engine starting relay monitoring unit process. In S24, it is determined whether the relay value acquired in S23 is a value other than the vehicle type-basis starting-enable relay value 54. If Yes, the process proceeds to S25 to invoke the engine starting relay control unit 51. After the engine starting relay setting value 52 is overwritten with the vehicle type-basis starting-enable relay value 54 corresponding to the starting-enabled state, the state of the engine starting external relay 20 is changed to the state corresponding to the vehicle type-basis starting-enable relay value 54. After that, the process proceeds to S26 to terminate the engine starting relay monitoring unit process. On the other hand, if No in the determination in S24, the process proceeds to S26 to terminate the engine starting relay monitoring unit process.

The operation of the engine starting relay monitoring unit is periodically performed, for example, every 30 seconds in the normal mode, every hour in the power saving mode. With this operation of the engine starting relay monitoring unit, in the supposed-to-be starting-enabled state (when the engine starting relay monitoring execution flag is on), the engine starting external relay 20 can be controlled such that the vehicle always enters the starting-enabled state, even when the memory 13 is rewritten with a numerical value different from the original numerical value due to a malfunction of firmware of the vehicle-mounted device. This control can prevent the vehicle from unintentionally entering the starting-disabled state and disturbing legitimate use of the vehicle. For example, even when the value of the engine starting relay setting value 52 in the memory 13 is rewritten with an unintended value due to a malfunction of firmware of the vehicle-mounted device, the engine starting external relay 20 is controlled such that the vehicle always enters the starting-enabled state when the engine starting relay monitoring execution flag 56 is on, thereby keeping the vehicle in the starting-enabled state.

The operation of the engine-associated control unit 57 is now described with reference to FIG. 10. When the engine-associated control unit process is started in S31, the process proceeds to S32 to receive an engine starting relay control command through the communication unit 50. The process then proceeds to S33 to determine whether the present engine state is off. If the determination in S33 is Yes, the process proceeds to S34. In S34, it is determined whether the difference between the present time and the engine stop time is equal to or longer than the relay change-prohibited period 58 (X minutes). If the determination in S33 is No and the determination in S34 is No, the process proceeds to S35 to invoke the communication unit 50 and notify the server 3 that the engine starting relay control command is ignored. Subsequently, the process proceeds to S41 and the process of the engine-associated control unit ends. If the determination in S34 is Yes, the process proceeds to S36 to invoke the engine starting relay control unit 51 and change the state of the engine starting external relay 20 to the state corresponding to the engine starting relay control command. The process then proceeds to S37. In S37, the process waits for the engine state reevaluation period 60 (Y seconds) and then proceeds to S38. In S38, it is determined whether the executed engine starting relay control command is to change to the starting-disabled state and the present engine state is on. If the determination in S38 is Yes, the process proceeds to S39. In S39, the engine starting relay control unit 51 is invoked, and the state of the engine starting external relay 20 is changed to the state corresponding to the vehicle type-basis starting-enable relay value 54. Subsequently, the process proceeds to S40. In S40, the communication unit 50 is invoked, and the server 3 is notified that the engine starting relay control command is ignored. The process then proceeds to S41 and the process of the engine-associated control unit ends. On the other hand, If the determination in S38 is No, the process goes on to S41 and the process of the engine-associated control unit ends.

The operation of the engine-associated control unit 57 is performed periodically, for example, every 30 seconds in the normal mode and every hour in the power saving mode. In S35 and S40, the communication unit 50 is invoked and the server 3 is notified that the engine starting relay control command is ignored. The server 3, which receives the notification that the engine starting relay control command has been ignored, repeatedly transmits an engine starting relay control command until a notification of the relay state change completion of the engine starting external relay 20 is given in S16 in FIG. 6. This operation of the engine-associated control unit 57 can prevent the vehicle from entering the starting-disabled state in a dangerous place or in a place where the vehicle obstructs people, in consideration of safety of the vehicle, when the vehicle is to be changed to the starting-disabled state under an instruction from the server. With the relay change-prohibited period 58 (X minutes, for example, two minutes) taken into consideration, it is possible to prevent the vehicle from improperly switching to the starting-disabled state even when the power of the vehicle is turned on again immediately after the power of the vehicle is turned off. In addition, with the engine state reevaluation period 60 (Y seconds, for example, five seconds) taken into consideration, the engine starting relay control command is not employed (the engine starting relay control command is ignored) when the vehicle-mounted device 1 receives an engine starting relay control command corresponding to the starting-disabled state immediately after the power of the vehicle is turned on (within Y seconds), thereby preventing the problem of switching to the starting-disabled state when the power of the vehicle is on.

Second Embodiment

Figure 11:
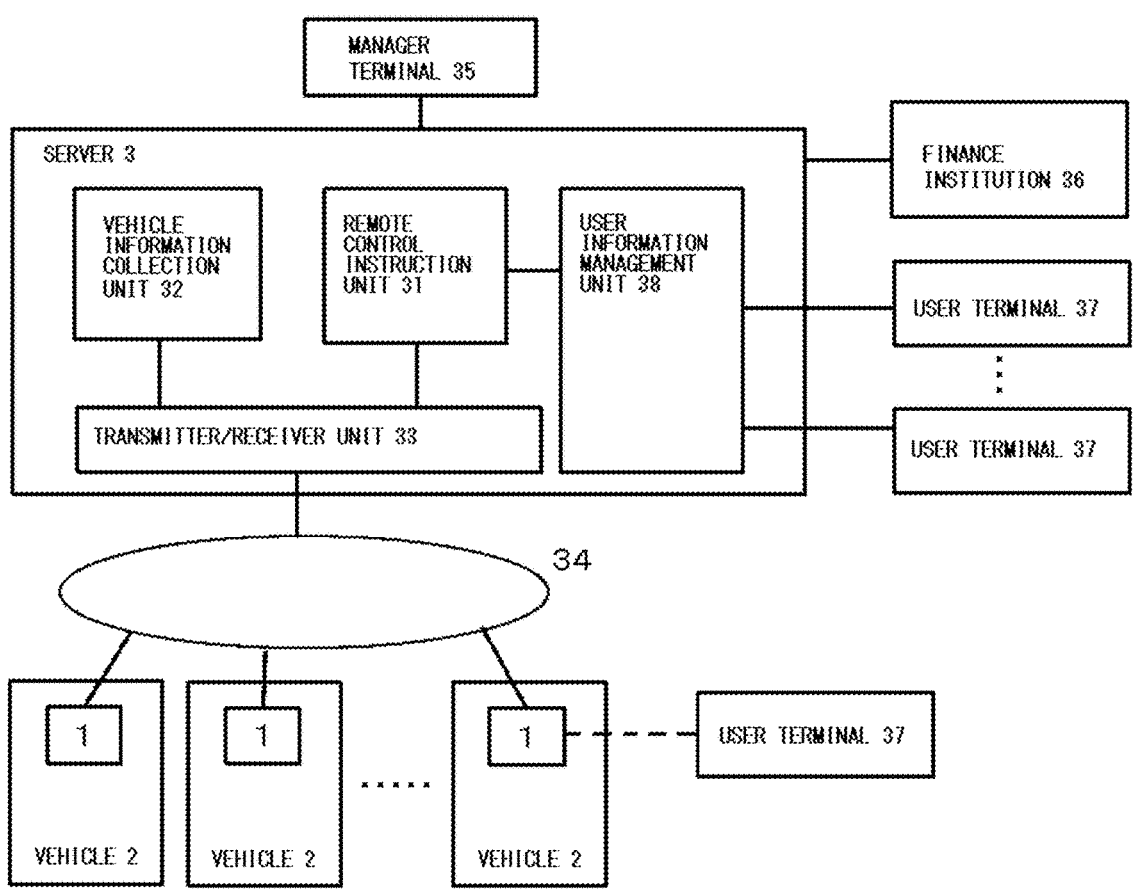
FIG. 11 is an overview of a vehicle door locking and unlocking system according to a second embodiment.

Referring to FIG. 11, the vehicle door locking and unlocking system according to a second embodiment of the present invention will be described for carsharing as an example. FIG. 11 is an overview of the vehicle door locking and unlocking system according to the second embodiment. The same components as in FIGS. 1 to 10 are denoted by the same reference signs and will not be further described. In the first embodiment, a lock command and an unlock command are transmitted from the user terminal 37 to the vehicle-mounted device 1 through the server 3. The second embodiment differs from the embodiment in that a lock command and an unlock command are transmitted from the user terminal 37 directly to the vehicle-mounted device 1.

The procedure of reserving a certain vehicle 2 from the user terminal 37 and unlocking the door of the certain vehicle 2 is described first. A plurality of offices (for example, manned or unmanned parking areas) are registered as parking areas where the user picks up and returns a vehicle. The user information management system manages the reservation status of vehicles, the vehicle allocation status for each office, etc. The user communicates with the user information management unit 38 for reserving a certain vehicle 2 using the user terminal 37 and specifies the period of use (the year, month, day, and time of beginning of use, and the year, month, day, and time of return), the office to pick up the vehicle, and the office to return the vehicle.

The user information management unit 38 checks whether the vehicle can be allocated as specified by the user and replies to the user terminal 37 as to whether the vehicle can be reserved. If it can be reserved, the user information management unit 38 asks the user terminal to pay the charge, for example, by credit card. When a predetermined charge is paid by the user terminal 37, the reservation is fixed. When the reservation is fixed, the user information management unit 38 transmits the reservation information to the user terminal. On the other hand, if the vehicle is unable to be allocated as specified by the user, the user terminal 37 is notified that the vehicle is unable to be reserved. At this time, the user information management unit 38 can offer a plurality of other available conditions similar to those previously specified.

When the reservation is fixed, the user information management unit 38 transmits door lock key information and vehicle specification information (for example, office location, license plate number, etc.) to the user terminal 37. The user terminal 37 receives the door lock key information and vehicle number information. The timing at which the user terminal 37 receives the door lock key information from the user information management unit 38 may be, for example, 10 minutes before the reservation start time. However, the present invention is not limited thereto, and the timing may be any time after fixation of the reservation and before the reservation start time. The user information management unit 38 transmits door lock key information corresponding to the one transmitted to the user terminal 37 to the certain vehicle for reservation using the wireless communication network 34 through the remote control instruction unit 31, at the timing when door lock key information is transmitted to the user terminal 37 (for example, 10 minutes before the reservation start time) or at a time shortly before this timing (for example, 15 minutes before the reservation start time). In addition, reservation information such as reservation period, pick-up office, and return office may be transmitted to the vehicle-mounted device 1 together with the door lock key information.

At the reservation start time or shortly before the start time (for example, 10 minutes before), the user transmits an unlock command using door lock key information from the user terminal 37 to the vehicle-mounted device 1, near the certain vehicle matched with the specification information on the reserved vehicle at the reserved office. The distance between the user terminal 37 and the reserved vehicle 2 in this communication is preferably within the area of near field communication from the user terminal 37 to the vehicle-mounted device 1 and set to a distance close enough for the user to check the status of the reserved vehicle. Examples of the near field communication include Bluetooth®, ZigBee®, infrared communication, and FRID. However, the present invention is not limited to those example. Any type of near field communication may be employed. The user terminal 37 and the vehicle-mounted device 1 each contain a transmitter/receiver for specific near field communication.

In this communication, the vehicle-mounted device 1 authenticates this unlock command because the door lock key information transmitted in advance to the vehicle-mounted device 1 from the server 3 using the wireless communication network 34 agrees with the door lock key information included in the unlock command transmitted from the user terminal 37 to the vehicle-mounted device 1. In the vehicle-mounted device 1, when the unlock command is authenticated, the internal relay 25 is controlled for activation for a predetermined time (for example, about 0.1 to 0.2 seconds) to control the external relay 28. The external relay 28 is switched to drive the door lock actuator 29, thereby opening the door lock 4. At this point of time, the door locks 4 of all the doors of the certain vehicle may be opened. However, the present invention is not limited thereto. For example, only the door lock 4 of the door at the driver's seat may be opened or the door locks 4 of the front and back doors on the driver's seat side may be opened.

In the case in which the vehicle-mounted device 1 has received reservation information such as reservation period, the vehicle-mounted device 1 determines that the unlock command that the reserved vehicle receives from the user terminal 37 after the reservation start time or from shortly before the reservation start time (for example, 10 minutes before) to the reservation end time is valid in a state in which the reserved vehicle 2 is in the pick-up office designated at the time of reservation. However, it is determined that the unlock command received earlier (for example, 10 minutes or more earlier) than the reservation time or after the end of the reservation time is invalid. If it is determined that the unlock command is invalid due to the reservation time, the vehicle-mounted device 1 transmits a message to the user terminal 37 to notify the user that the reservation time is over.

An operation key such as a mechanical key or a smart key is stored in a predetermined place in the vehicle 2. Once the unlock command unlocks the door, the operation key can be used as usual to use the reserved vehicle 2.

The procedure of stopping using the reserved vehicle 2 and returning the reserved vehicle 2 to the parking area of the office specified at the time of reservation will be described. The engine is stopped in a state in which the reserved vehicle 2 is parked in the parking area of the office specified at the time of reservation. After the vehicle is powered off, the operation key is stored in a predetermined place in the vehicle. The user takes out all the belongings and transmits a lock command from the user terminal 37 to the vehicle-mounted device 1 when ready for returning the reserved vehicle 2. In the vehicle-mounted device 1, the door lock key information included in the lock command is authenticated, whereby the internal relay 25 is controlled for activation for a predetermined time (for example, about 0.1 to 0.2 seconds) to control the external relay 28. When the external relay 28 is switched, the door lock actuator 29 is driven to close the door lock 4. At this point of time, the door locks 4 of all the doors of the certain vehicle may be closed. Which door to lock or not to unlock can be decided as desired.

Upon detecting that the vehicle 2 is parked at the return office registered at the time of reservation, based on the position information on the vehicle 2 from the vehicle information acquisition unit 32, the user information management unit 38 displays a message on the user terminal 37 to prompt a lock command from the user terminal 37 to the vehicle-mounted device 1. Finally, at the point of time when locking of the reserved vehicle 2 is completed, it is assumed that the return of the reserved vehicle 2 has completed, and the user information management unit 38 transmits a message indicating completion of the return processing to the user terminal 37. The vehicle-mounted device 1 may detect which of the operation key and the vehicle-mounted device 1 locks the door, so that the user information management unit 38 can grasp that the return has completed based on the information on the vehicle information acquisition unit 32.

Here, the position of the reserved vehicle 2 can be grasped by the GPS of the vehicle-mounted device 1. In the case in which the reservation information such as reservation period, pick-up office, and return office has been transmitted to the vehicle-mounted device 1, the vehicle-mounted device 1 may transmit a message indicating that the parking position is different from the return location to the user terminal 37 to alert the user. The vehicle-mounted device 1 can also determine whether the door can be locked, based on the acquired vehicle information. For example, when the engine is running, the lock command is disabled, and a message indicating that the door is unable to be locked is transmitted to the user terminal through the user information management unit 38 to alert the user.

In carsharing, the user may want to extend the use period due to unavoidable reasons such as traffic conditions. In the case in which the user wants to extend the reserved use period, the user can register an extended use period to the user information management unit 38 in advance from the user terminal 37, as previously mentioned. The user information management unit 38 allocates vehicles with enough time so as to prevent overbooking by a plurality of users. In case a vehicle fails to be allocated as scheduled due to the extended use period or other reasons, the user information management unit 38 sends a message to the user terminal 37 in advance to indicate that the vehicle fails to be allocated as scheduled and proposes an alternative car plan to the user terminal 37.

Since the door lock key information varies with reservation, the lock command and the unlock command to the same vehicle from the same user terminal 37 are disabled after the end of the reservation period. However, if an extended use period is registered, the same door lock key information is enabled for the extended period.

It is preferable that the carsharing offices (for example, manned or unmanned parking areas) are located where the radio wave condition is good for communication between the wireless communication network 34 and the user terminal 37. This is because the poor radio wave condition may hinder the communication between the user terminal 37 and the server 3 or the communication between the server 3 and the vehicle-mounted device 1 to prevent appropriate transmission of door lock key information and reservation information, causing trouble in locking and unlocking of the certain vehicle 2 and transmission of information to the user terminal. As long as the radio wave condition in carsharing offices is ensured, the user does not have to be concerned about the radio wave condition of wireless communication during use of the certain vehicle 2 and can transmit a lock command or an unlock command directly from the user terminal 1 to the vehicle-mounted device 1.

In the system in which the vehicle-mounted device 1 can directly receive a lock command and an unlock command from the user terminal 37, the vehicle-mounted device 1 may be configured to receive a lock command and an unlock command from the server 3. In this case, even if the user has lost or left the user terminal 37 at home or other place, the user may use any other means to allow the server 3 to authenticate the user and confirm the reservation. Then, a lock command and an unlock command can be transmitted to the vehicle-mounted device 1 through the server 3 to lock and unlock the door.

Although the system for carsharing has been described here, a similar system is applicable to car rental. Locking and unlocking the vehicle 2 from the user terminal 37 through the server 3 is applicable to car lease and other services.

Third Embodiment

Figure 12:
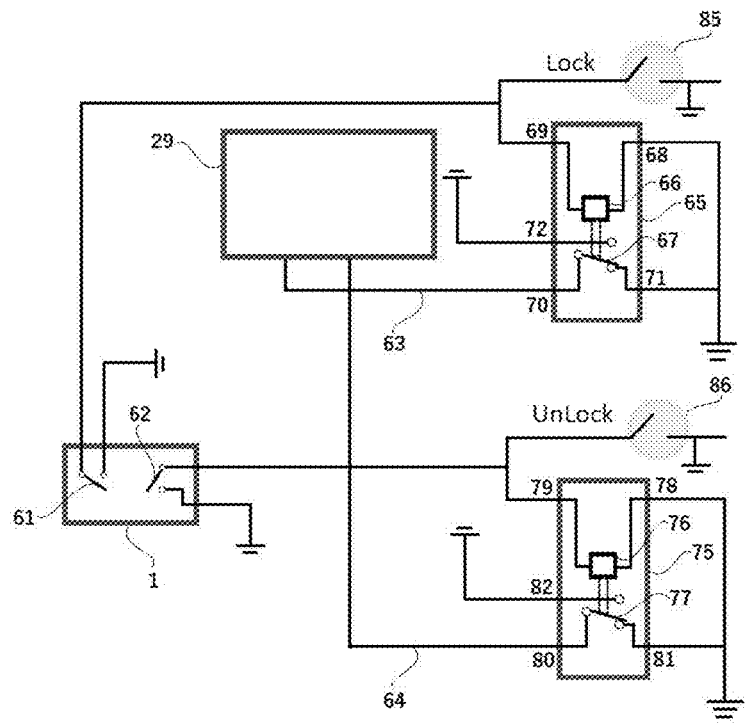
FIG. 12 is a wiring diagram of a door lock actuator control circuit according to a third embodiment.

Referring to FIG. 12, the operation of the internal relay and the external relay according to a third embodiment of the present invention will be described. FIG. 12 is a wiring diagram of a door lock actuator control circuit 26A according to the third embodiment. The door lock actuator control circuit 26 has the following five modes according to the connection of a 12-V power supply and the ground.

(1) Negative control (normally, the locking line and the unlocking line are connected to the 12-V power supply)

(2) Positive control 1 (normally, the locking line and the unlocking line are connected to the ground)

(3) Positive control 2 (normally, the locking line and the unlocking line are open)

(4) Negative/positive control (during locking, the ground; during unlocking, 12-V power supply)

(5) Positive/negative control (during locking, 12-V power supply; during unlocking, the ground)

The first embodiment corresponds to (1) negative control, and the third embodiment corresponds to (2) positive control 1. As for fourth to seventh embodiments described later, the fourth embodiment corresponds to (3) positive control 2, the fifth embodiment corresponds to a modification to (3) positive control 2, the sixth embodiment corresponds to (4) negative/positive control, and the seventh embodiment corresponds to (5) positive/negative control.

In the circuit in the third embodiment, the locking line 63 is connected to the 12-V power supply to lock or unlock the door. The vehicle-mounted device 1 including the first internal relay 61 and the second internal relay 62 is connected between the door key lock switch 85 and the door key unlock switch 86, and the door lock actuator 29. The door lock actuator 29 can be controlled through the first external relay 65 and the second external relay 75 by operating the first internal relay 61 and the second internal relay 62 of the vehicle-mounted device 1.

The door lock actuator 29 is, for example, a DC motor capable of forward/reverse rotation. Both ends of the DC motor are connected to the locking line 63 and the unlocking line 64 normally connected to the ground. The locking line 63 is connected to the terminal 70 of the first external relay. The unlocking line 64 is connected to the terminal 80 of the second external relay 75. The switch contact 67 connected to the terminal 70 of the first external relay is mechanically biased toward the terminal 71 normally connected to the ground. When the coil 66 is energized, the contact 67 is switched to the terminal 72 connected to the 12-V power supply. The terminal 68 at one end of the coil 66 is connected to the ground similarly to the terminal 71. The terminal 69 at the other end of the coil 66 is connected to one end of the door key lock switch 85 serving as a normally open switch, and the other end of the door key lock switch 85 is connected to the 12-V power supply. One end of the door key lock switch 85 is connected to one end of the first internal relay 61 serving as a normally open switch, and the other end of the first internal relay 61 is connected to the 12-V power supply.

The switch contact 77 connected to the terminal 80 of the second external relay is mechanically biased toward the terminal 81 normally connected to the ground. When the coil 76 is energized, the switch contact 77 is switched to the terminal 82 connected to the 12-V power supply. The terminal 78 at one end of the coil 76 is connected to the ground similarly to the terminal 81. The terminal 79 at the other end of the coil 76 is connected to one end of the door key unlock switch 86 serving as a normally open switch, and the other end of the door key unlock switch 86 is connected to the 12-V power supply. One end of the door key unlock switch 86 is connected to one end of the second internal relay serving as a normally open switch, and the other end of the second internal relay 62 is connected to the 12-V power supply.

An unlock command is transmitted from the user terminal 37 to the user information management unit 38. If it is determined that the unlock command from the user terminal 37 is valid, the user information management unit 38 transmits a door unlock instruction to transmit an unlock command to the certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62 serving as a normally open switch is controlled for activation for a predetermined time (for example, about 0.1 to 0.2 seconds). When the second internal relay 62 is controlled for activation, the coil 76 of the second external relay 75 is excited, causing the switch contact 77 of the second external relay 75 biased toward the terminal 81 normally connected to the ground to switch to the terminal 82 connected to the 12-V power supply. The unlocking line 64 is then connected to the 12-V power supply through the terminal 80, the switch contact 77, and the terminal 82. Since 12 V is applied to one end of the DC motor serving as the door lock actuator 29 and the other end of the DC motor is at the ground potential, the DC motor serving as the door lock actuator 29 rotates in the unlocking direction for a predetermined time (for example, about 0.1 to 0.2 seconds) during which the second internal relay 62 serving as a normally open switch is activated, thereby unlocking the door. After the predetermined time during which the second internal relay 62 serving as a normally open switch is activated has passed, the second internal relay 62 is open, so that the switch contact 77 of the second external relay 75 is biased toward the terminal 81 connected to the ground. Since both ends of the DC motor serving as the door lock actuator 29 go to the ground potential, the DC motor stops operating.

On the other hand, when a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2. In the vehicle-mounted device 1, receiving the lock command from the remote control instruction unit 31, the first internal relay 61 serving as a normally open switch is controlled for activation for a predetermined time (for example, about 0.1 to 0.2 seconds). When the first internal relay 61 is activated, the coil 66 of the first external relay 65 is excited, causing the switch contact 67 of the first external relay 65 normally biased toward the ground to switch to the terminal 72 connected to the 12-V power supply. Then, the locking line 63 is connected to the 12-V power supply through the terminal 70, the switch contact 67, and the terminal 72. Since 12 V is applied to the other end of the DC motor serving as the door lock actuator 29 and one end of the DC motor is connected to the ground, the DC motor serving as the door lock actuator 29 rotates in the locking direction opposite to the aforementioned unlocking direction for a predetermined time (for example, about 0.1 to 0.2 seconds) during which the first internal relay 61 serving as a normally open switch is activated, thereby locking the door. After the predetermined time during which the first internal relay 61 serving as a normally open switch is activated has passed, the first internal relay 61 is open, so that the switch contact 67 of the first external relay 65 is biased toward the terminal 71 connected to the ground, and both ends of the DC motor serving as the door lock actuator 29 are connected to the ground, causing the DC motor to stop operating.

Fourth Embodiment

Figure 13:
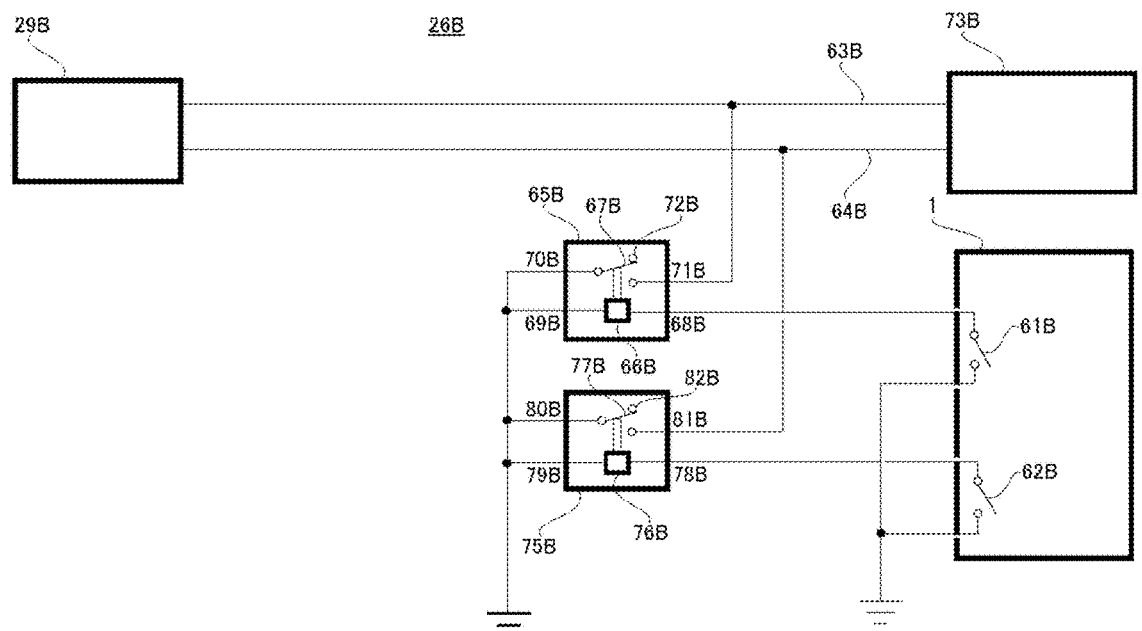
FIG. 13 is a wiring diagram of a door lock actuator control circuit according to a fourth embodiment.

Referring to FIG. 13, the operation of the internal relay and the external relay according to a fourth embodiment of the present invention will be described. FIG. 13 is a wiring diagram of a door lock actuator control circuit 26B according to the fourth embodiment. The mode of the door lock actuator control circuit 26 corresponds to (3) positive control 2 above. The 12-V power supply is connected to a locking line 63B and an unlocking line 64B connected to a door lock relay unit 73B to drive the DC motor serving as a door lock actuator 29B to lock and unlock the door. The vehicle-mounted device 1 including the first internal relay 61 and the second internal relay 62 is connected between the door key switch and the door lock actuator 29 through a first external relay 65B and a second external relay 75B. The control by a first internal relay 61B and a second internal relay 62B drives the DC motor serving as the door lock actuator 29B to lock and unlock the door.

An unlock command is transmitted from the user terminal 37 to the user information management unit 38. If it is determined that the unlock command from the user terminal 37 is valid, the user information management unit 38 transmits a door unlock instruction to transmit an unlock command to a certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62B serving as a normally open switch is controlled for activation for a predetermined time (for example, about 0.1 to 0.2 seconds). A switch contact 77B of the second external relay 75B is connected to the 12-V power supply. When the second internal relay 62B is activated, the coil 76B of the second external relay 75B is excited, causing the switch contact 77B of the second external relay 75B normally biased toward an open terminal 82B to switch to a terminal 81B connected to the unlocking line 64B. Then, 12 V is applied to the unlocking line 64B by the 12-V power supply through the terminal 81B and the switch contact 77B. This causes the DC motor serving as the door lock actuator 29 to rotate in the unlocking direction for a predetermined time (for example, about 0.1 to 0.2 seconds) during which the second internal relay 62B serving as a normally open switch is controlled for activation, thereby unlocking the door. After the predetermined time during which the second internal relay 62B serving as a normally open switch is activated has passed, the second internal relay 62B is open, so that the switch contact 77B of the second external relay 75B is biased toward the open terminal 82B, and the DC motor serving as the door lock actuator 29 stops operating.

When a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2 for reservation. In the vehicle-mounted device 1, receiving the lock command from the remote control instruction unit 31, the first internal relay 61B serving as a normally open switch is controlled for activation for a predetermined time (for example, about 0.1 to 0.2 seconds). A switch contact 67B of the first external relay 65B is connected to the 12-V power supply. When the first internal relay 61B is controlled for activated, a coil 66B of the first external relay 65B is excited, causing the switch contact 67B of the first external relay 65B normally biased toward an open terminal 72B to switch to a terminal 71B connected to the locking line 63B. Then, 12 V is applied to the locking line 63B by the 12-V power supply through the terminal 71B and the switch contact 67B. This causes the DC motor serving as the door lock actuator 29 to rotate in the locking direction opposite to the aforementioned unlocking direction for a predetermined time (for example, about 0.1 to 0.2 seconds) during which the first internal relay 61B serving as a normally open switch is activated, thereby locking the door. After the predetermined time during which the first internal relay 61B serving as a normally open switch is activated has passed, the first internal relay 61B is open, so that the switch contact 67B of the first external relay 65B is biased toward the open terminal 72B, and the DC motor serving as the door lock actuator 29 stops operating.

Fifth Embodiment

Figure 14:
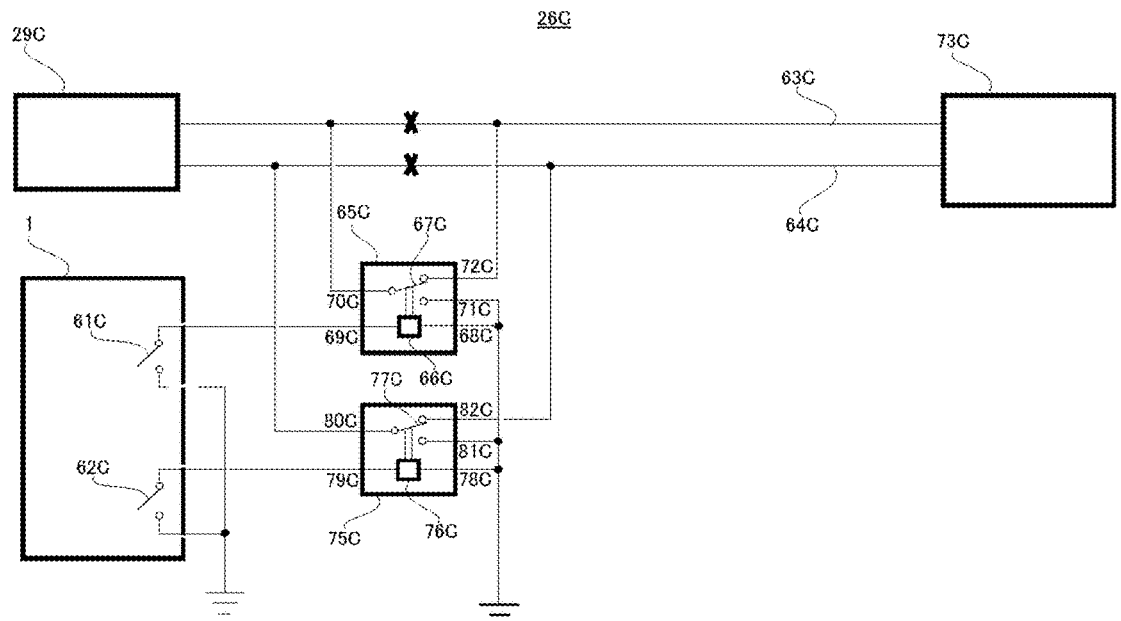
FIG. 14 is a wiring diagram of a door lock actuator control circuit according to a fifth embodiment.

Referring to FIG. 14, the operation of the internal relay and the external relay according to the fifth embodiment of the present invention will be described. FIG. 14 is a wiring diagram of a door lock actuator control circuit 26C according to the fifth embodiment. The mode of the door lock actuator control circuit 26 is a modification to (3) positive control 2 above. The 12-V power supply is connected to a locking line 63C and an unlocking line 64C connected to a door lock relay unit 73C to drive the DC motor serving as a door lock actuator 29C to lock and unlock the door. A first external relay 65C is connected so as to bypass the locking line 63C, and the portion of wiring from which the locking line 63C is bypassed is cut off. Similarly, a second external relay 75C is connected so as to bypass the unlocking line 64C, and the portion of wiring from which the unlocking line 64C is bypassed is cut off. The vehicle-mounted device 1 including a first internal relay 61C and a second internal relay 62C is connected between the door key switch and the door lock actuator 29 through the first external relay 65C and the second external relay 75C. The control by the first internal relay 61C and the second internal relay 62C drives the DC motor serving as the door lock actuator 29C to lock and unlock the door.

An unlock command is transmitted from the user terminal 37 to the user information management unit 38. If it is determined that the unlock command from the user terminal 37 is valid, the user information management unit 38 transmits a door unlock instruction to transmit an unlock command to a certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62C serving as a normally open switch is controlled for activation for a predetermined time (for example, about 0.1 to 0.2 seconds). A terminal 80C, a switch contact 77C, and a terminal 82C of the second external relay 75C normally bypass the cut-off portion of the unlocking line 64C. When the second internal relay 62C serving as a normally open switch is controlled for activation for a predetermined time (for example, about 0.1 to 0.2 seconds), a coil 76C of the second external relay 75C is excited, and the switch contact 77C is switched to a terminal 81C connected to the 12-V power supply. Then, the 12-V power supply is connected to the unlocking line 64C through the terminal 80C, the switch contact 77C, and the terminal 81C to apply 12 V. This causes the DC motor serving as the door lock actuator 29C to rotate in the unlocking direction for a predetermined time (for example, about 0.1 to 0.2 seconds) during which the second internal relay 62C serving as a normally open switch is activated, thereby unlocking the door. After the predetermined time during which the second internal relay 62C serving as a normally open switch is activated has passed, the second internal relay 62C is open, so that the switch contact 77C of the second external relay 75C is biased toward the terminal 82C to bypass the cut-off portion of the unlocking line 64C. The DC motor serving as the door lock actuator 29 therefore stops operating.

When a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2 for reservation. In the vehicle-mounted device 1, receiving the lock command from the remote control instruction unit 31, the first internal relay 61C serving as a normally open switch is controlled for activation for a predetermined time (for example, about 0.1 to 0.2 seconds). A terminal 70C, a switch contact 67C, and a terminal 72C of the first external relay 65C normally bypass the cut-off portion of the locking line 63C. When the first internal relay 61C serving as a normally open switch is controlled for activation for a predetermined time (for example, about 0.1 to 0.2 seconds), a coil 66C of the first external relay 65C is excited, and the switch contact 67C is switched to a terminal 71C connected to the 12-V power supply. Then, the 12-V power supply is connected to the locking line 63C through the terminal 70C, the switch contact 67C, and the terminal 71C to apply 12 V. This causes the DC motor serving as the door lock actuator 29C to rotate in the locking direction opposite to the aforementioned unlocking direction for a predetermined time (for example, about 0.1 to 0.2 seconds) during which the first internal relay 61C serving as a normally open switch is activated, thereby locking the door. After the predetermined time during which the first internal relay 61C serving as a normally open switch is activated has passed, the first internal relay 61C is open, so that the switch contact 67C of the first external relay 65C is biased toward the terminal 72C to bypass the cut-off portion of the locking line 63C. The DC motor serving as the door lock actuator 29 therefore stops operating.

Sixth Embodiment

Figure 15:
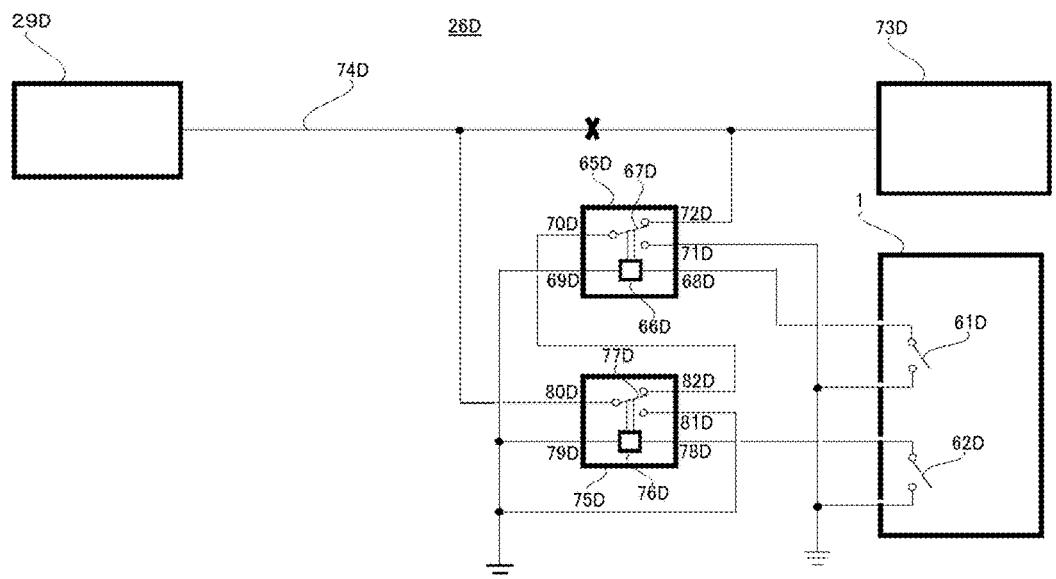
FIG. 15 is a wiring diagram of a door lock actuator control circuit according to a sixth embodiment.

Referring to FIG. 15, the operation of the internal relay and the external relay according to a sixth embodiment of the present invention will be described. FIG. 15 is a wiring diagram of a door lock actuator control circuit 26D according to the sixth embodiment. The mode of the door lock actuator control circuit 26 corresponds to (4) negative/positive control above. A locking/unlocking line 74D connected to a door lock relay unit 73D is connected to a vacuum pump unit serving as a door lock actuator 29D. The locking/unlocking line 74D goes to the ground potential during locking and goes to the 12-V power supply during unlocking. A series circuit of a first external relay 65D and a second external relay 75D is connected so as to bypass the locking/unlocking line 74D, and the portion of wiring from which the locking/unlocking line 74D is bypassed is cut off. The vehicle-mounted device 1 including a first internal relay 61D and a second internal relay 62D is connected between the door key switch and the door lock actuator 29D through the first external relay 65D and the second external relay 75D. The control by the first internal relay 61D and the second internal relay 62D drives the vacuum pump unit serving as the door lock actuator 29D to lock and unlock the door.

An unlock command is transmitted from the user terminal 37 to the user information management unit 38. If it is determined that the unlock command from the user terminal 37 is valid, the user information management unit 38 transmits a door unlock instruction to transmit an unlock command to a certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62D serving as a normally open switch is controlled for activation for a predetermined time. A switch contact 67D of the first external relay 65D is biased toward a terminal 72D normally connected to the locking/unlocking line. A switch contact 77D of the second external relay 75D is biased toward a terminal 82D connected to a terminal 70D of the first external relay 65D. Thus, the cut-off portion of the locking/unlocking line 74D is normally bypassed through the terminal 72D, the switch contact 67D, the terminal 70D, the terminal 82D, the switch contact 77D, and a terminal 80D. When the second internal relay 62D serving as a normally open switch is controlled for activation for a predetermined time, a coil 76D of the second external relay 75D is excited, and the switch contact 77D is switched to a terminal 81D connected to the 12-V power supply. The 12-V power supply is thus connected to the locking/unlocking line 74D through the terminal 80D, the switch contact 77D, and the terminal 81D to apply 12 V. This causes the vacuum pump unit serving as the door lock actuator 29D to be driven in the locking direction for a predetermined time during which the second internal relay 62D serving as a normally open switch is activated, thereby unlocking the door. After the predetermined time during which the second internal relay 62D serving as a normally open switch is activated has passed, the second internal relay 62D is open, so that the switch contact 77D of the second external relay 75D is biased toward the terminal 82D, and the cut-off portion of the locking/unlocking line 74D is bypassed by the series circuit of the first external relay 65D and the second external relay 75D. The vacuum pump unit serving as the door lock actuator 29D then stops operating.

When a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2 for reservation. In the vehicle-mounted device 1, receiving the lock command from the remote control instruction unit 31, the first internal relay 61D serving as a normally open switch is controlled for activation for a predetermined time. The switch contact 67D of the first external relay 65D is biased toward the terminal 72D normally connected to the locking/unlocking line 74D. The switch contact 77D of the second external relay 75D is biased toward the terminal 82D connected to the terminal 70D of the first external relay 65D. The cut-off portion of the locking/unlocking line 74D is thus normally bypassed through the terminal 72D, the switch contact 67D, the terminal 70D, the terminal 82D, the switch contact 77D, and the terminal 80D. When the first internal relay 61D serving as a normally open switch is controlled for activation for a predetermined time, the coil 66D of the first external relay 65D is excited, and the switch contact 67D is switched to the terminal 71D connected to the ground. The locking/unlocking line 74D is thus connected to the ground through the terminal 80D, the switch contact 77D, the terminal 82D, the terminal 70D, the switch contact 67D, and the terminal 71D. This causes the vacuum pump unit serving as the door lock actuator 29D to be driven in the locking direction opposite to the aforementioned unlocking direction for a predetermined time during which the first internal relay 61D serving as a normally open switch is activated, thereby locking the door. After the predetermined time during which the first internal relay 61D serving as a normally open switch is activated has passed, the first internal relay 61D is open, so that the switch contact 67D of the first external relay 65D is biased toward the terminal 72D, and the cut-off portion of the locking/unlocking line 74D is bypassed by the series circuit of the first external relay 65D and the second external relay 75D. The vacuum pump unit serving as the door lock actuator 29D thus stops operating.

Seventh Embodiment

Referring to FIG. 16, the operation of the internal relay and the external relay according to a seventh embodiment of the present invention will be described. FIG. 16 is a wiring diagram of a door lock actuator control circuit 26E according to the seventh embodiment. The mode of the door lock actuator control circuit 26 corresponds to (5) positive/negative control above. A locking/unlocking line 74E connected to a door lock switch 83E is connected to a central door lock module serving as a door lock actuator 29E. The locking/unlocking line 74E goes to the power supply voltage 12 V during locking and goes to the ground potential during unlocking. A first external relay 65E is connected so as to bypass the locking/unlocking line 74E, and the portion of wiring from which the locking/unlocking line 74E is bypassed is cut off. Between the door lock switch 83E and the door lock actuator 29E, a second internal relay 62E of the vehicle-mounted device 1 is connected and a first internal relay 61E of the vehicle-mounted device 1 is connected through the first external relay 65E. The control by the first internal relay 61E and the second internal relay 62E drives the central door lock module serving as the door lock actuator 29E to lock and unlock the door.

An unlock command is transmitted from the user terminal 37 to the user information management unit 38. If it is determined that the unlock command from the user terminal 37 is valid, the user information management unit 38 transmits a door unlock instruction to transmit an unlock command to a certain vehicle 2 to the remote control instruction unit 31. The remote control instruction unit 31, receiving the door unlock instruction from the user information management unit 38, transmits an unlock command to the certain vehicle 2 for reservation. In the vehicle-mounted device 1, receiving the unlock command from the remote control instruction unit 31, the second internal relay 62E serving as a normally open switch is controlled for activation for a predetermined time. One end of the second internal relay 62E is connected to the ground, and the other end is connected to the locking/unlocking line 74E. When the second internal relay 62E serving as a normally open switch is controlled for activation for a predetermined time, the locking/unlocking line 74E goes to the ground potential to drive the central door lock module in the unlocking direction, thereby unlocking the door.

When a lock command is transmitted from the user terminal 37 to the user information management unit 38, the user information management unit 38 transmits a door lock instruction to transmit a lock command to the certain vehicle 2 to the remote control instruction unit 31. The remote control instruction unit 31, receiving the door lock instruction from the user information management unit 38, transmits a lock command to the certain vehicle 2 for reservation. In the vehicle-mounted device 1, receiving the lock command from the remote control instruction unit 31, the first internal relay 61E serving as a normally open switch is controlled for activation for a predetermined time. Since a switch contact 67E of the first external relay 65E is normally biased toward a terminal 72E, the cut-off portion of the locking/unlocking line 74E is normally bypassed through a terminal 70E, the switch contact 67E, and the terminal 72E. When the first internal relay 61E serving as a normally open switch is controlled for activation for a predetermined time, a coil 66E of the first external relay 65E is excited, and the switch contact 67E is switched to a terminal 71E connected to the 12-V power supply. Then, the 12-V power supply is connected to the locking/unlocking line 74E through the terminal 70E, the switch contact 67E, and the terminal 71E to apply 12 V, causing the central door lock module serving as the door lock actuator 29E to be driven in the locking direction opposite to the aforementioned unlocking direction for a predetermined time during which the first internal relay 61E serving as a normally open switch is activated, thereby locking the door. After the predetermined time during which the first internal relay 61E serving as a normally open switch is activated has passed, the first internal relay 61E is open, so that the switch contact 67E of the first external relay 65E is biased toward the terminal 72E, and the cut-off portion of the locking/unlocking line 74E is bypassed through the first external relay 65E. The central door lock module serving as the door lock actuator 29E thus stops operating.

Eighth Embodiment

In the first embodiment described above, the vehicle remote control system is applied to an internal combustion engine vehicle and makes a switch to the starting-disabled state by cutting off the engine starting control line (ST line) of the internal combustion engine using the engine starting external relay 20. In the following, an embodiment of the vehicle remote control system is described with reference to FIG. 17, which is applied to a vehicle using power other than an internal combustion engine vehicle, for example, an electric vehicle (hereinafter referred to as "EV") or a hybrid electric vehicle (hereinafter referred to as "HEV") and includes control other than the ST line control to make a switch to the starting-disabled state.

FIG. 17 illustrates a control method for the starting-disabled state. In FIG. 17, the kinds of vehicles are classified into internal combustion engine vehicle, EV, parallel HEV, series HEV, and series-parallel HEV, also classified according to whether an immobilizer is equipped, and further classified into a key type and a push type according to the starting method. FIG. 17 then illustrates which of three methods: method A, method B, and method C can be applied as the control method for the starting-disabled state. As the three control methods, the method A is cutting the ST line, the method B is disabling key authentication, and the method C is invalidating the push button.

The key type and the push type are classification according to the operation method for starting the power. The key type refers to the method in which a key is inserted into the key cylinder to start the power and switch between OFF, ACC, IGN, and START. The push type refers to the method for the smart key type, in which the power-starting push button is pushed to turn on the power.

The HEV is defined as follows. The parallel system is a system that drives wheels with a motor and an engine and charges a battery using the motor. The series system is a system that drives an electric generator with an engine for charging and drives wheels with a motor. The series-parallel system is a system that drives wheels with a motor and an engine and drives an electric generator with the engine for charging to drive the motor.

Here, the configuration of the vehicle-mounted device 1 for either an EV or an HEV has many parts common to those for an internal combustion engine vehicle illustrated in FIG. 2 but differs from the configuration for an internal combustion engine vehicle in that the EV does not include an internal combustion engine and the HEV has a mode of running with the motor alone. In the case of an EV, it is desirable to provide means for detecting that the push button is pushed and the power is on, instead of the IGN input detecting unit 17, and the engine starting external relay 20 may be replaced by electronic means, as will be described later. In the case of an HEV, it is desirable to provide means for detecting that the power is on, instead of the IGN input detecting unit 17, and the engine starting external relay 20 may be replaced by electronic means, as will be described later.

The three control methods, namely, the method A, the method B, and the method C will be described in detail below. The wiring for inserting the engine starting external relay 20 varies depending on the methods, but in any of the methods, starting the power is impossible in the starting-disabled state, and starting the power is possible in the starting-enabled state.

The method A is the method described in the first embodiment. In this method, the engine starting control line (ST line) of the internal combustion engine is cut off using the engine starting external relay 20 to make a switch to the starting-disabled state and can be applied to the internal combustion engine vehicle. In the method A, the engine starting external relay 20 is inserted to the ST line, and power supply to the starter motor is interrupted by opening the engine starting external relay 20 in the starting-disabled state, thereby preventing the starting of the engine.

The method B is a method employed by a vehicle equipped with an immobilizer. An immobilizer is a device that allows the engine to start only when authentication is successful. More specifically, a unique ID code is recorded in an IC chip called a transponder embedded in a key, and the ID code of the transponder is authenticated by the ID code registered in the electronic control device of the vehicle body. In the method B, the engine starting external relay 20 is inserted to the signal line for the ID code on the transponder side received by the vehicle from the transponder in the immobilizer or the signal line for the ID code on the vehicle side in the immobilizer, and the engine starting external relay 20 is open in the starting-disabled state, so that authentication of the ID code has failed, and therefore the engine is unable to be started in the starting-disabled state. Here, the engine starting external relay 20 is used to set the starting-disabled state. However, any means may be used as long as the authentication of the ID code has failed in the starting-disabled state, and, for example, electronic means may be used. When electronic means is used, it is also desirable that whether the state is the starting-disabled state or the starting-enabled state can be detected by the engine starting relay input/output 18 (see FIG. 2).

The method C is a method applied to a vehicle with a power-starting push button in a case of the smart key type. A smart key-type vehicle does not have a key cylinder for starting the power and starts the power by notifying the electronic control device that the push button is pushed. For example, a key-type EV does not exist and all EVs are of the push type. In the method C, the engine starting external relay 20 is inserted to the wiring for the push button, and the engine starting external relay 20 is open in the starting-disabled state, so that the power is not turned on by operating the push button in the starting-disabled state. Here, an example in which the engine starting external relay 20 is used to set the starting-disabled state has been described. However, any means may be used that prevents the electronic control device from being notified that the push button is pushed in the starting-disabled state. For example, electronic means may be used. When electronic means is used, it is also desirable that whether the state is the starting-disabled state or the starting-enabled state can be detected by the engine starting relay input/output 18 (see FIG. 2).

In the case equipped with an immobilizer and of the key type, the method A or the method B is applicable for internal combustion engine vehicles, no EV is applicable, and the method B is applicable for all of parallel HEVs, series HEVs, and series-parallel HEVs.

In the case equipped with an immobilizer and of the push type, the method A, the method B, or the method C is applicable for internal combustion engine vehicles, the method B or the method C is applicable for EVs, the method B or the method C is applicable for all of parallel HEVs, series HEVs, and series-parallel HEVs.

In the case not equipped with an immobilizer and of the key type, the method A is applicable for internal combustion engine vehicles, no EV is applicable, and no methods support parallel HEVs, series HEVs, and series-parallel HEVs.

In the case not equipped with an immobilizer and of the push type, the method A or the method C is applicable for internal combustion engine vehicles, the method C is applicable for EVs, and the method C is applicable for parallel HEVs, series HEVs, and series-parallel HEVs.

The invention claimed is:

1. A vehicle door locking and unlocking vehicle-mounted device comprising:
    communication means for receiving a lock command or an unlock command from a user terminal directly or through a server; and
    at least two internal relays connected to wiring installed in a vehicle between a door key switch installed in the vehicle and a door lock actuator installed in the vehicle, wherein
    the internal relays include a first internal relay and a second internal relay connected in parallel to ground or a power supply, the first internal relay and the second internal relay independently connected to at least one external relay to respectively control locking and unlocking of a door installed in the vehicle,
    the external relay includes a first external relay and a second external relay,
    the door lock actuator is powered through two power feed lines,
    when the lock command is received, a state of the first internal relay changes for a first predetermined time, so that one of the power feed lines is grounded by the first external relay to drive the door lock actuator in a first direction to lock the door, and
    when the unlock command is received, a state of the second internal relay changes for a second predetermined time, so that the other of the power feed lines is grounded by the second external relay to drive the door lock actuator in a second direction to unlock the door,
    the communication means receives an engine starting relay control command to switch between a starting-disabled state and a starting-enabled state of the vehicle from the server, the vehicle-mounted device further comprises:
engine starting relay input/output means for controlling an engine starting external relay configured to switch between the starting-disabled state and the starting-enabled state of the vehicle; and
vehicle information-associated control means for controlling the engine starting external relay based on the engine starting relay control command.

2. The vehicle door locking and unlocking vehicle-mounted device according to claim 1, wherein the door lock actuator is any one of a door lock motor unit, a vacuum pump unit, and a central door lock module.

3. A vehicle door locking and unlocking vehicle-mounted device comprising:
communication means for receiving a lock command or an unlock command from a user terminal directly or through a server; and
at least two internal relays connected to wiring installed in a vehicle between a door key switch installed in the vehicle and a door lock actuator installed in the vehicle, wherein
the internal relays include a first internal relay and a second internal relay connected in parallel to ground or a power supply, the first internal relay and the second internal relay independently connected to at least one external relay to respectively control locking and unlocking of a door installed in the vehicle,
the external relay includes a first external relay and a second external relay,
the door lock actuator is powered through two power feed lines,
the two power feed lines are connected with a door lock relay unit respectively through first external relay and a second external relay, and at least part of wiring at a portion bypassed by the first external relay and the second external relay is cut off,
when the lock command is received, a state of the first internal relay changes for the first predetermined time, so that power supply voltage is applied from the first external relay to one of the power feed lines to drive the door lock actuator in a first direction to lock the door, and
when the unlock command is received, a state of the second internal relay changes for the second predetermined time, so that power supply voltage is applied from the second external relay to the other of the power feed lines to drive the door lock actuator in a second direction to unlock the door,
the communication means receives an engine starting relay control command to switch between a starting-disabled state and a starting-enabled state of the vehicle from the server,
the vehicle-mounted device further comprises:
engine starting relay input/output means for controlling an engine starting external relay configured to switch between the starting-disabled state and the starting-enabled state of the vehicle; and
vehicle information-associated control means for controlling the engine starting external relay based on the engine starting relay control command.

4. A vehicle door locking and unlocking vehicle-mounted device comprising:
communication means for receiving a lock command or an unlock command from a user terminal directly or through a server; and
at least two internal relays connected to wiring installed in a vehicle between a door key switch installed in the vehicle and a door lock actuator installed in the vehicle, wherein
the internal relays include a first internal relay and a second internal relay connected in parallel to ground or a power supply, the first internal relay and the second internal relay independently connected to at least one external relay to respectively control locking and unlocking of a door installed in the vehicle,
the external relay includes a first external relay and a second external relay,
the door lock actuator is powered through one power feed line,
the one power feed line is connected through a first external relay and a second external relay, and at least part of wiring at a portion bypassed by the first external relay and the second external relay is cut off,
when the lock command is received, a state of the first internal relay changes for the first predetermined time, so that the one power feed line is grounded to drive the door lock actuator in a first direction to lock the door, and
when the unlock command is received, a state of the second internal relay changes for the second predetermined time, so that power supply voltage is applied to the one power feed line to drive the door lock actuator in a second direction to unlock the door,
the communication means receives an engine starting relay control command to switch between a starting-disabled state and a starting-enabled state of the vehicle from the server,
the vehicle-mounted device further comprises:
engine starting relay input/output means for controlling an engine starting external relay configured to switch between the starting-disabled state and the starting-enabled state of the vehicle; and
vehicle information-associated control means for controlling the engine starting external relay based on the engine starting relay control command.

5. A vehicle door locking and unlocking vehicle-mounted device comprising:
communication means for receiving a lock command or an unlock command from a user terminal directly or through a server; and
at least two internal relays connected to wiring installed in a vehicle between a door key switch installed in the vehicle and a door lock actuator installed in the vehicle, wherein
the internal relays include a first internal relay and a second internal relay connected in parallel to ground or a power supply, the first internal relay and the second internal relay independently connected to at least one external relay to respectively control locking and unlocking of a door installed in the vehicle,
the external relay includes a first external relay and a second external relay,
the door lock actuator is powered through one power feed line,
the one power feed line is connected through a first external relay, and at least part of wiring a a portion bypassed by the first external relay is cut off,
when the lock command is received, a state of the first internal relay changes for the first predetermined time, so that power supply voltage is applied to the one power feed line to drive the door lock actuator in a first direction to lock the door, and when the unlock command is received, a state of the second internal relay changes for the second predetermined time, so that the one power feed line is grounded to drive the door lock actuator in a second direction to unlock the door, the communication means receives an engine starting relay control command to switch between a starting-disabled state and a starting-enabled state of the vehicle from the server, the vehicle-mounted device further comprises:
    engine starting relay input/output means for controlling an engine starting external relay configured to switch between the starting-disabled state and the starting-enabled state of the vehicle; and
    vehicle information-associated control means for controlling the engine starting external relay based on the engine starting relay control command.

6. The vehicle door locking and unlocking vehicle-mounted device according to claim 5, further comprising vehicle information detecting means for detecting at least an on/off state of vehicle power, wherein
    the vehicle information-associated control means controls the engine starting external relay based on an elapsed time since a change in the on/off state of vehicle power detected by the vehicle information detecting means.

7. A vehicle comprising the vehicle-mounted device according to claim 1.

8. A vehicle door locking and unlocking system comprising the vehicle-mounted device according to claim 1.

9. The vehicle door locking and unlocking system according to claim 8, wherein the server makes a reservation for a certain vehicle based on operation from a user terminal.

10. The vehicle door locking and unlocking system according to claim 9, wherein the server transmits door lock key information corresponding to the vehicle-mounted device of the certain vehicle to the user terminal in advance based on information on the reservation, and
    the user terminal transmits a lock command or an unlock command directly to the vehicle-mounted device or to the vehicle-mounted device through the server, based on the door lock key information.

11. The vehicle door locking and unlocking system according to claim 8, wherein the server transmits, to the vehicle-mounted device of the certain vehicle, an engine starting relay control command to switch the vehicle to a starting-disabled state in a case:
    where the certain vehicle is used without an advance reservation;
    where there is a problem in making payment for the reservation;
    where the certain vehicle is used for a predetermined period or longer beyond a period of the reservation without advance procedure for extension;
    where the certain vehicle is used in a geographical range beyond a range set at the time of reservation; or
    where a manner of usage of the certain vehicle violates a condition set at the time of reservation.

12. The vehicle door locking and unlocking system according to claim 9, wherein when the door lock key information is not sent from the user terminal, the server also transmits a lock command or an unlock command to the vehicle-mounted device of the certain vehicle upon confirmation of the reservation and user authentication by the server.

* * * * *